United States Patent
Ohta

(10) Patent No.: US 7,658,676 B2
(45) Date of Patent: Feb. 9, 2010

(54) GAME APPARATUS AND STORAGE MEDIUM HAVING GAME PROGRAM STORED THEREON

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 486 days.

(21) Appl. No.: 11/648,583

(22) Filed: Jan. 3, 2007

(65) Prior Publication Data

US 2008/0119270 A1     May 22, 2008

(30) Foreign Application Priority Data

Nov. 16, 2006 (JP) ............................. 2006-310616

(51) Int. Cl.
*A63F 13/02* (2006.01)
(52) U.S. Cl. .............................. 463/37; 463/3; 463/36; 345/158
(58) Field of Classification Search ................ 463/2–5, 463/36–39; 345/158, 163
See application file for complete search history.

(56) References Cited

U.S. PATENT DOCUMENTS

| | | | |
|---|---|---|---|
| 4,839,838 A * | 6/1989 | LaBiche et al. ............. | 708/141 |
| 5,574,479 A | 11/1996 | Odell | |
| 5,627,565 A | 5/1997 | Morishita et al. | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 2005/0052414 A1* | 3/2005 | Park et al. .................... | 345/158 |
| 2006/0164393 A1* | 7/2006 | Wu et al. ..................... | 345/163 |
| 2008/0280660 A1* | 11/2008 | Ueshima et al. ................ | 463/3 |

FOREIGN PATENT DOCUMENTS

JP     2001-104636      4/2001

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.
Wilson, Andrew D., et al.; "Demonstration of the XWand Interface for Intelligent Spaces"; Microsoft Research; UIST'02 Companion; pp. 37-38.

(Continued)

*Primary Examiner*—James S McClellan
*Assistant Examiner*—Lawrence Galka
(74) *Attorney, Agent, or Firm*—Nixon & Vanderhye PC

(57) ABSTRACT

A game apparatus obtains acceleration data representing an acceleration vector in at least two predetermined axial directions of the input device repeatedly, then calculates a change amount of each of the acceleration vectors represented by acceleration data obtained during a predetermined swing period, and then calculates an accumulated value obtained by accumulating the calculated change amounts. A swing strength of the input device is calculated based on the accumulated value. The game processing is executed using the calculated swing strength.

21 Claims, 12 Drawing Sheets

OTHER PUBLICATIONS

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dII?ViewItem&item=350096666675&indexURL.

* cited by examiner

GAME APPARATUS AND STORAGE MEDIUM HAVING GAME PROGRAM STORED THEREON

CROSS REFERENCE TO RELATED APPLICATION

The disclosure of Japanese Patent Application No. 2006-310616, filed on Nov. 16, 2006, is incorporated herein by reference.

BACKGROUND AND SUMMARY

The exemplary embodiments disclosed herein relate to a game program and a game apparatus, and more specifically to a game program and a game apparatus for executing game processing in accordance with a movement of an input device itself.

Conventionally, a game apparatus for executing game processing in accordance with a movement of an input device itself is described in, for example, patent document 1 (Japanese Laid-Open Patent Publication No. 2001-104636). This document discloses a baseball bat-shaped input device including an acceleration sensor using a piezoelectric beeper or the like. A player performs a game operation by actually swinging the baseball bat-shaped input device. The game apparatus detects the speed of the baseball bat-shaped input device (the moving speed or the rotation speed) and reflects the detected speed on the movement of a ball in the game. Thus, the flying distance or direction of the ball in the game can be changed.

The game apparatus described in patent document 1 determines the movement of the ball using the value of the maximum moving speed of the input device. However, the strength of the swing on the ball cannot be calculated with only the speed of the input device at one point in time. The reason is that the strength of the swing is determined by factors such as the length of the stroke of the swing (time length and distance) as well as the maximum speed of the input device. With the method described in patent document 1, for example, the same result is obtained as long as the maximum speed is the same regardless of whether the stroke of the swing is longer or shorter. The strength of the swing cannot be reflected on the game.

Therefore, a feature of certain exemplary embodiments is to provide a storage medium having a game program stored thereon and a game apparatus capable of calculating the strength of the swing of an input device.

The certain exemplary embodiments have the following features. The reference numerals and additional explanations in parentheses in this section of the specification indicate the correspondence with the exemplary embodiments described later for easier understanding of the certain exemplary embodiments described herein, and should not be considered limiting in any way.

A first aspect is directed to a computer-readable storage medium having stored thereon a game program (60) executable by a computer (CPU 10) of a game apparatus (3) for executing game processing (FIG. 11) in accordance with a movement of an input device (controller 5). The game program causes the computer to execute an obtaining step (S31), a change amount calculation step (S22), an accumulated value calculation step (S23), a swing strength calculation step (S16), and a game processing step (S3). In the obtaining step, the computer obtains an acceleration (acceleration vector A or processing acceleration vector "a") generated in at least two predetermined axial directions of the input device repeatedly. In the change amount calculation step, the computer calculates a change amount (as) of each of the accelerations obtained in the obtaining step during a predetermined time period (swing period). In the accumulated value calculation step, the computer calculates an accumulated value (s) obtained by accumulating the calculated change amounts. In the swing strength calculation step, the computer calculates a swing strength (p) of the input device based on the accumulated value. In the game processing step, the computer executes the game processing using the calculated swing strength.

In a second aspect, the input device may comprise a predetermined button. In this case, the game program may cause the computer to further execute a period setting step (S13 and S15) of setting the predetermined time period based on a pressing state of the predetermined button.

In a third aspect, the game program may cause the computer to further execute a period setting step (S13 and S15) of setting a time period in which the acceleration has a magnitude of equal to or larger than a predetermined magnitude as the predetermined period.

In a fourth aspect, in the accumulated value calculation step, the computer may calculate the accumulated value each time the change amount is calculated, such that when the change amount is smaller than a reference value, the accumulated value is smaller than a previous accumulated value (expression (3)). In this case, in the swing strength calculation step, the computer calculates the swing strength, such that as the maximum accumulated amount (s_max) calculated during the predetermined period is larger, the swing strength is greater (expression (5)).

In a fifth aspect, in the accumulated value calculation step, the computer may calculate, each time the change amount is calculated, a new accumulated value by adding the change amount to a value obtained by subtracting a predetermined amount from the current accumulated value (expression (5)). In this case, in the swing strength calculation step, the computer calculates the swing strength, such that as the maximum accumulated amount calculated during the predetermined period is larger, the swing strength is greater.

In a sixth aspect, the predetermined amount may be a predetermined ratio of the current accumulated value.

In a seventh aspect, the input device may comprise an acceleration sensor for detecting an acceleration in at least two predetermined axial directions. In this case, in the obtaining step, the computer may calculate, as an acceleration to be obtained, a vector (processing acceleration vector) which changes so as to follow a vector represented by data output from the acceleration sensor.

In an eighth aspect, the input device may comprise an acceleration sensor for detecting an acceleration in at least two predetermined axial directions. In this case, in the obtaining step, the computer may calculate, as an acceleration to be newly obtained, a vector internally dividing a range between a vector representing the current acceleration and a vector represented by data output from the acceleration sensor.

In a ninth aspect, the game program may cause the computer to further execute a magnitude calculation step (S26). In the magnitude calculation step, the computer calculates a magnitude of each of the accelerations obtained during the predetermined period. In the swing strength calculation step, the computer may calculate the swing strength of the input device based on the accumulated value and the acceleration magnitudes (expression (5)).

In a tenth aspect, in the swing strength calculation step, the computer may calculate the swing strength of the input device based on the maximum value (av_max) of the acceleration magnitudes calculated during the predetermined period and the accumulated value. In an eleventh aspect, in the swing strength calculation step, the computer may calculate the swing strength of the input device based on the accumulated value and the acceleration magnitudes.

The certain exemplary embodiments may be provided in the form of a game apparatus having equivalent functions to those of the game program for executing the above-described steps.

According to the first aspect, the change amount of the acceleration of the input device during the swing period is calculated. Based on the accumulated value obtained by accumulating the change amounts, the swing strength is calculated. By using the change amount, the swing strength, which reflects the length of time in which the input device is actually swung and also the speed at which the input device is actually swung, is calculated. Thus, according to the first aspect, the swing strength of the input device can be accurately calculated.

According to the second aspect, the swing period is determined based on the pressing state of the button. Therefore, the player himself/herself can determine the swing period. As a result, it does not occur that the operation of swinging the input device is performed against the intention of the player merely because the player has inadvertently swung the input device. This improves the operability of swinging the input device.

According to the third aspect, the time period in which the acceleration is equal to or larger than the predetermined value is set as the swing period. Unless the player actually performs an operation of swinging the input device, the swing period is not set. Therefore, it does not occur that the operation of swinging the input device is performed against the intention of the player. This improves the operability of swinging the input device.

According to the fourth aspect, when the change amount is smaller than the reference value, the maximum accumulated value is not updated. Even if the input device moves very slightly after the player finishes swinging the input device, such a small motion of the input device is not reflected on the swing strength. According to the fourth aspect, the swing strength of the input device is accurately calculated. The fourth aspect is especially effective in the case where the swing period which is set in the game apparatus does not match the time period from the start until the end of the swing of the controller 5 as in the second aspect.

According to the fifth aspect, a new accumulated value is calculated by adding a newly calculated change amount to a value obtained by subtracting a predetermined amount from the current accumulated value. Like in the fourth aspect, the accumulated value is calculated to be smaller than the previous accumulated value when the change amount is smaller than the reference value ("predetermined value" in the fifth aspect). According to the fifth aspect, like the fourth aspect, the swing strength of the input device can be calculated accurately.

According to the sixth aspect, an amount which is a predetermined ratio of the current accumulated value is set as the predetermined amount. Therefore, the predetermined value can be calculated, with the current accumulated value being reflected.

According to the seventh aspect, a vector which changes so as to follow the vector represented by the data output from the acceleration sensor is used as a vector representing the acceleration. By this, it can be avoided that the acceleration exceeds the detection limit of the acceleration sensor. Thus, the swing strength of the input device can be calculated more accurately.

According to the eighth aspect, a new acceleration is calculated as a vector internally dividing a range between the vector representing the current acceleration and the vector represented by data output from the acceleration sensor. Like in the seventh aspect, the new acceleration vector changes so as to follow the vector represented by the data output from the acceleration sensor. According to the eighth aspect, like the seventh aspect, it can be avoided that the acceleration exceeds the detection limit of the acceleration sensor. Thus, the swing strength of the input device can be calculated more accurately.

According to the ninth aspect, the swing strength of the input device is calculated based on the magnitude of the acceleration in addition to the accumulated value. Even when the swing motion of the input device is not easily reflected on the accumulated value (when the input device is swung slowly), such a motion of the input device can be reflected on the magnitude of the acceleration vector. According to the ninth aspect, the swing strength of the input device can be calculated accurately even in such a case.

According to the tenth aspect, the swing strength of the input device is calculated using the maximum acceleration magnitude calculated during the swing period. Therefore, the acceleration magnitude can be reflected on the swing strength accurately.

According to the eleventh aspect, a change amount between the acceleration obtained most newly and the acceleration obtained immediately previously can be calculated accurately.

These and other features, aspects and advantages of certain exemplary embodiments will become more apparent from the following detailed description of the exemplary embodiments when taken in conjunction with the accompanying drawings.

DETAILED DESCRIPTION

Overall Structure of the Game System

Figure 1:
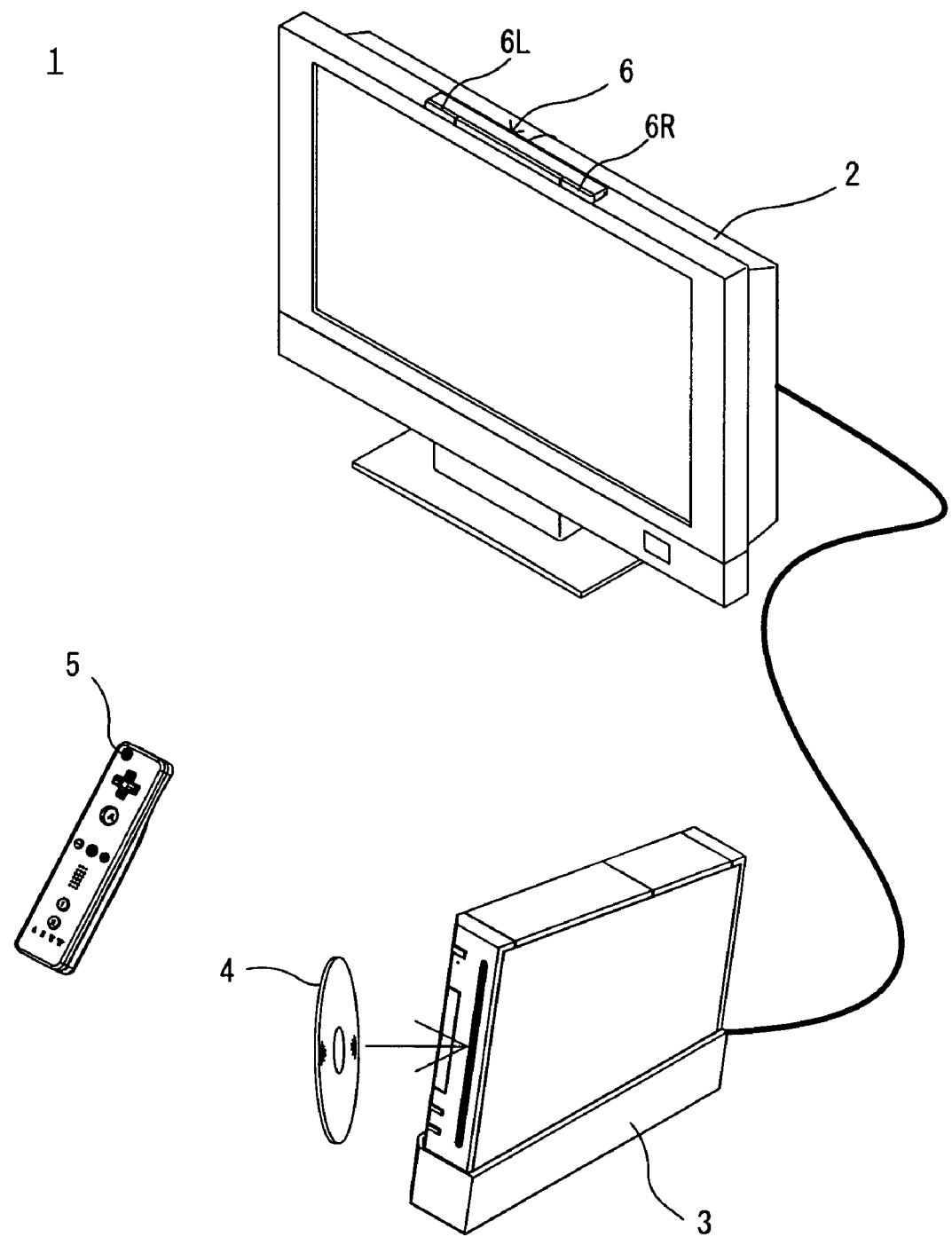
FIG. 1 is an external view of a game system 1 according to a certain exemplary embodiment.

With reference to FIG. 1, a game system 1 including a game apparatus according to certain exemplary embodiments will be described. FIG. 1 is an external view of the game system 1. Hereinafter, a game apparatus and a game program according to certain exemplary embodiments will be described using an installation type game apparatus. As shown in FIG. 1, the game system 1 includes a TV receiver (hereinafter, referred to simply as a "TV") 2, a game apparatus 3, an optical disc 4, a controller 5, and a sensor bar 6. In the game system 1, the game apparatus 3 executes game processing based on a game operation performed using the controller 5.

On the game apparatus 3, the optical disc 4 as an exemplary exchangeable information storage medium is detachably mounted. The optical disc 4 has stored thereon a game program to be executed by the game apparatus 3. The game apparatus 3 has, on a front surface thereof, an insertion opening for mounting the optical disc 4. The game apparatus 3 reads and executes the game program stored on the optical disc 4 inserted into the insertion opening to execute the game processing.

The game apparatus 3 is connected to the TV 2 via a connection cord. The TV 2 is a display device such as, for example, a home-use TV receiver. The TV 2 displays a game image obtained by the game processing executed by the game apparatus 3. The sensor bar 6 is provided in the vicinity of the TV 2 (in the example of FIG. 1, above a screen of the TV 2). The sensor bar 6 includes two markers 6R and 6L at both ends thereof. The markers 6R and 6L are specifically one or more infrared LEDs, and output infrared light forward from the TV 2. The sensor bar 6 is connected to the game apparatus 3. The game apparatus 3 is capable of controlling infrared LEDs in the sensor bar 6 to be on or off.

The controller 5 is an input device for providing the game apparatus 3 with operation data representing operation particulars performed thereon. The controller 5 and the game apparatus 3 are connected to each other by wireless communication. In this embodiment, the wireless communication between the controller 5 and the game apparatus 3 is performed using, for example, the Bluetooth (registered trademark) technology. In another embodiment, the controller 5 and the game apparatus 3 may be connected to each other by a line.

(Internal Structure of the Game Apparatus 3)

Figure 2:
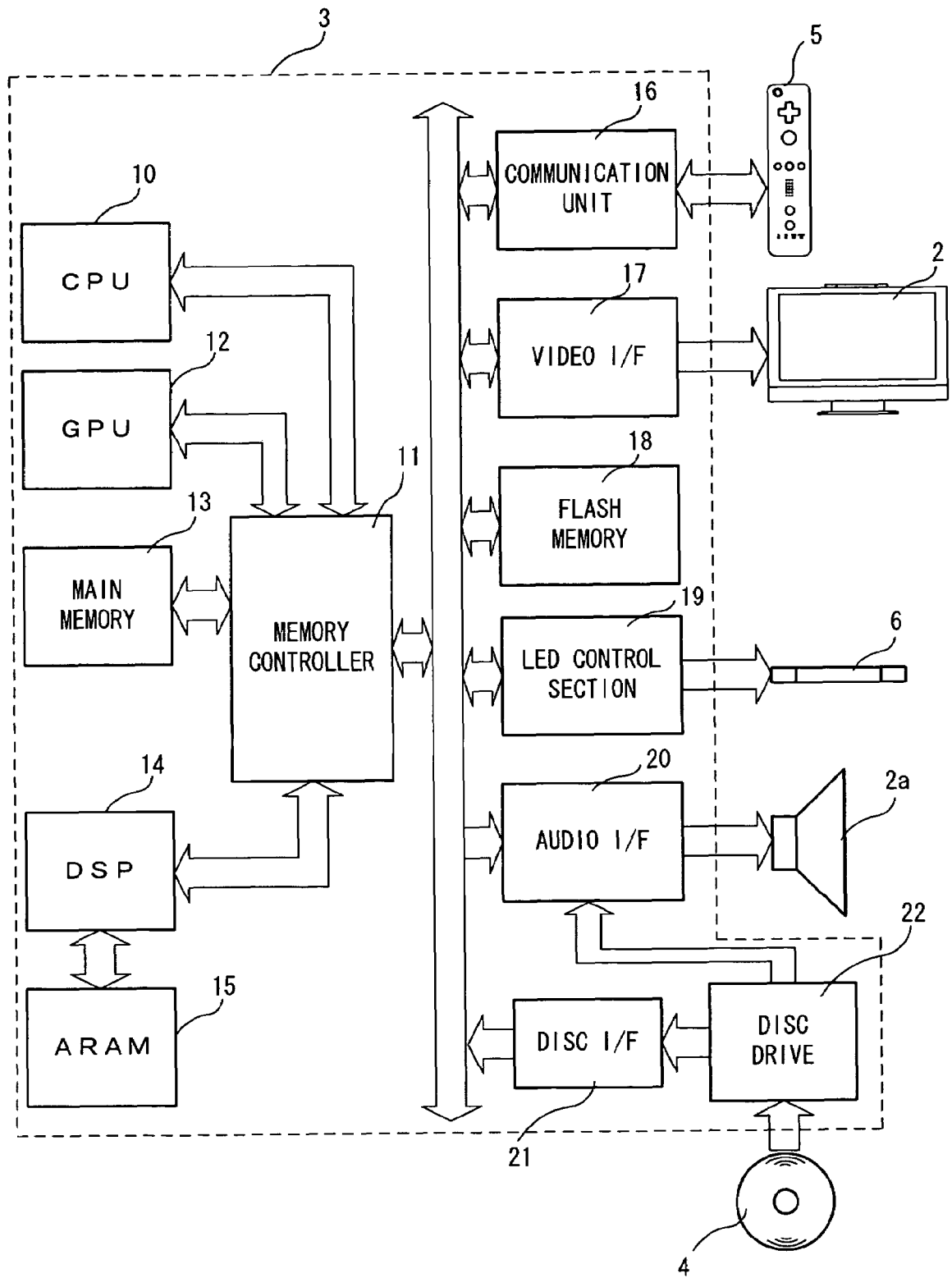
FIG. 2 is a block diagram of a game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a CPU (central processing unit) 10 for executing various types of programs. The CPU 10 executes a start program stored on a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, an ARAM (Audio RAM) 15 and the like via a memory controller 11. The memory controller 11 is connected to a communication unit 16, a video I/F (interface) 17, a flash memory 18, an LED control section 19, an audio I/F 20, and a disc I/F 21 via a predetermined bus. The video I/F 17 is connected to the TV 2, the LED control section 19 is connected to the sensor bar 6, the audio I/F 20 is connected to a speaker 2a mounted on the TV 2 and a disc drive 22, and the disc I/F 21 is connected to the disc drive 22.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) or a part of the storage area of the main memory 13. The GPU 12 generates game image data and a movie to be displayed on the TV 2 using such memories, and outputs the generated data or movie to the TV 2 via the memory controller 11 and the video I/F 37 as necessary.

The main memory 13 is a storage area used by the CPU 10, and stores a game program or the like necessary for processing performed by the CPU 10 as necessary. For example, the main memory 13 stores a game program, various types of data or the like read from the optical disc 4 by the CPU 10. The game program, the various types of data or the like stored on the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (e.g., storage of the game program or sound data already read). The DSP 14 reads the sound data stored on the ARAM 15 and outputs the sound data to the speaker 2a via the memory controller 11 and the audio I/F 20.

The memory controller 11 comprehensively controls data transfer, and is connected to the communication unit 16, the flash memory 18, the LED control section 19, and the I/Fs 17, 20 and 21. As described above, the communication unit 16 receives transmission data from the controller 5 and outputs the transmission data to the CPU 10.

The communication unit 16 transfers data between the game apparatus 3 and the controller 5. The controller 5 transmits operation data representing operation particulars performed thereon to the game apparatus 3. The communication unit 16 receives the operation data from the controller 5, and outputs the received operation data to the CPU 10 via the memory controller 11. The CPU 10 executes the game processing in accordance with the operation data. When control data for controlling the operation of the controller 5 is transmitted to the controller 5, the control data is output to the communication unit 16. The communication unit 16 transmits the input control data to the controller 5.

The video I/F 17 is connected to the TV 2, and image data generated by the GPU 12 is output to the TV 2 via the video I/F 17. The flash memory 18 acts as a backup memory for fixedly storing saved data or the like. The game apparatus 3 can reproduce a state of a game played in the past using saved data stored on the flash memory 18 and display a game image on the TV 2. The LED control section 19 is connected to infrared LEDs included in the sensor bar 6. For lighting up the infrared LEDs, the CPU 10 instructs the LED control section 19 to supply power. In accordance with the instruction, the LED control section 19 supplies power to the infrared LEDs, so that the infrared LEDs are lit up. In this embodiment, the infrared LEDs are lit up at least while the game program is being executed. The audio I/F 20 is connected to the speaker 2a built in the TV 2, so that that the sound data read by the DSP 14 from the ARAM 15 or sound data directly output from the disc drive 22 is output through the speaker 2a. The disc I/F 21 is connected to the disc drive 22. The disc drive 22 reads data stored at a predetermined reading position of the optical disc 4 and outputs the data to the disc I/F 21 or the audio I/F 20.

The game apparatus 3 includes a network communication section (not shown) and is connected to a network such as the Internet or the like. The game apparatus 3 can obtain various types of data from outside or transmits data to outside via the network communication section.

(Structure of the Controller 5)

Figure 3:
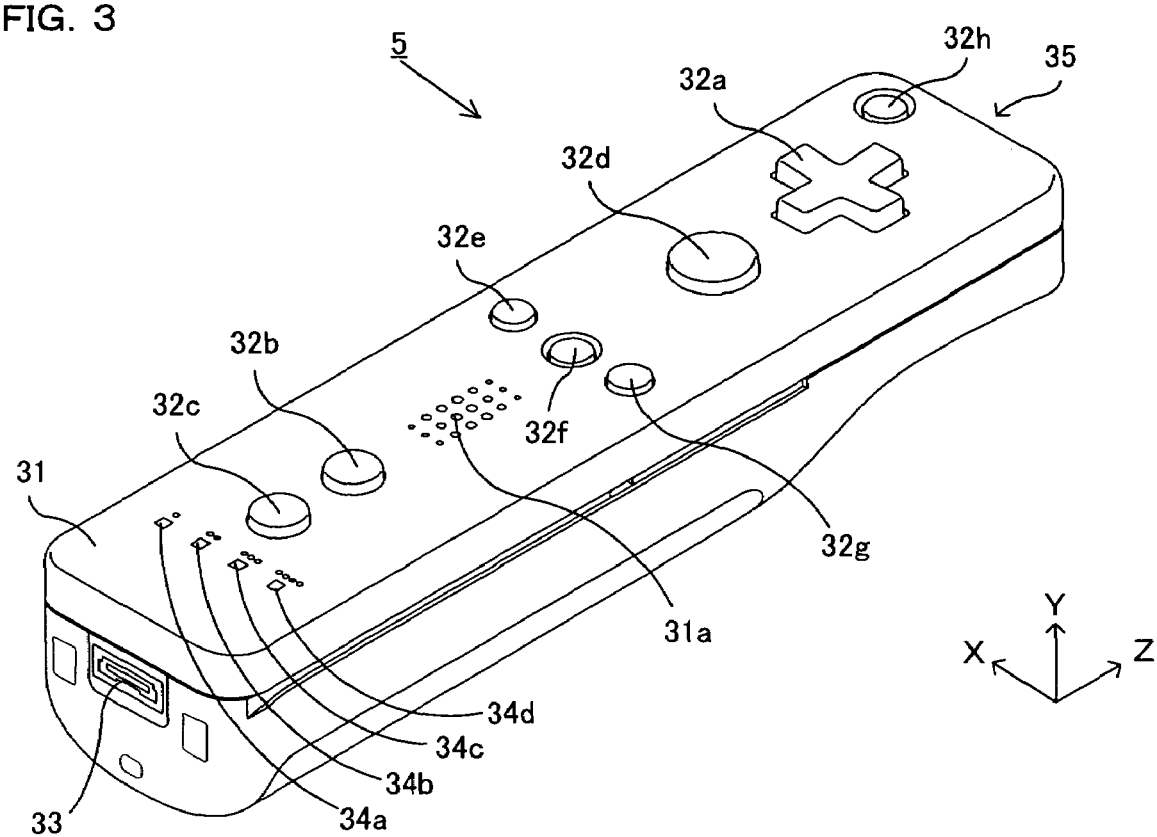
FIG. 3 is an isometric view showing an external structure of a controller 5.
Figure 4:
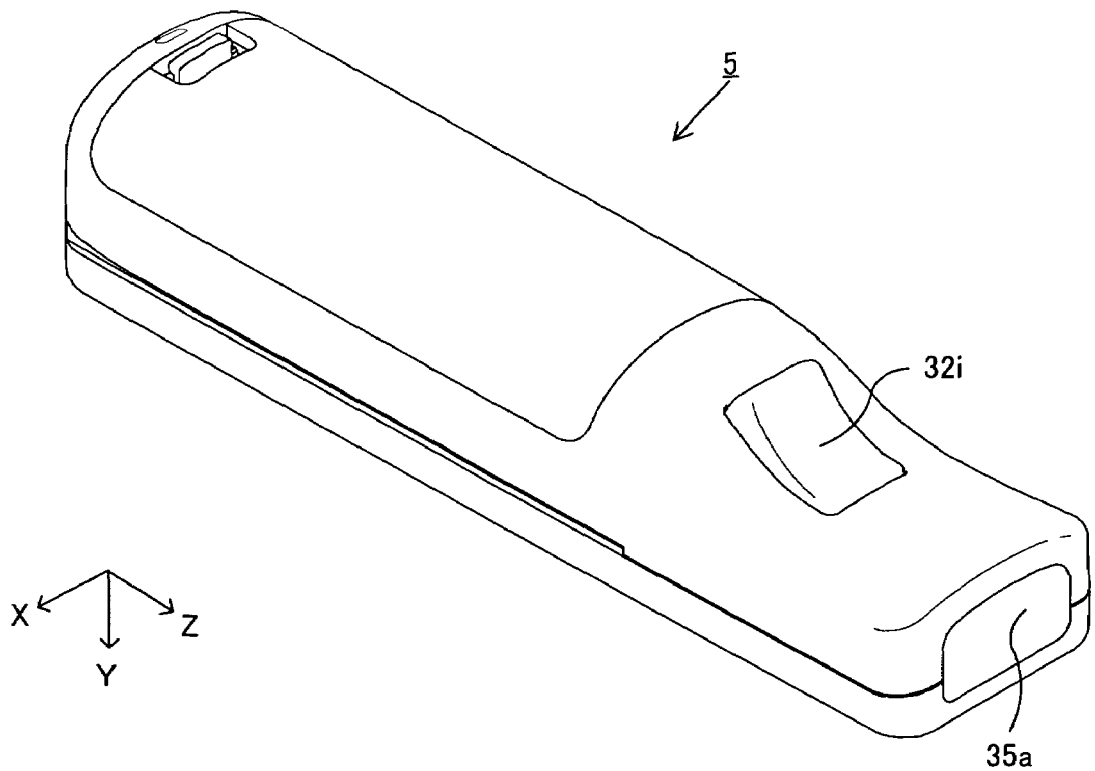
FIG. 4 is an isometric view showing an external structure of the controller 5.

With reference to FIG. 3 through FIG. 6, the controller 5 will be described. FIG. 3 and FIG. 4 are each an isometric view of the controller 5 showing an external view thereof. FIG. 3 is an isometric view of the controller 5 seen from the top rear side thereof. FIG. 4 is an isometric view of the controller 5 seen from the bottom front side thereof.

As shown in FIG. 3 and FIG. 4, the controller 5 includes a housing 31 formed by plastic molding or the like. The housing 31 has a generally parallelepiped shape extending in a longitudinal direction from front to rear (Z-axis direction shown in FIG. 3). The overall size of the housing 31 is small enough to be held by one hand of an adult or even a child. Using the controller 5, the player can perform a game operation of pressing buttons provided thereon or changing the position or posture thereof by moving the controller 5 itself. For example, the player can perform an operation on an operation target by swinging the controller 5 like a golf club, a baseball bat or a tennis racket, or by changing the position on the screen pointed by the controller 5.

The housing 31 includes a plurality of operation buttons. As shown in FIG. 3, on top surface of the housing 31, a cross key 32a, a first button 32b, a second button 32c, an A button 32d, a minus button 32e, a home button 32f, a plus button 32g, and a power button 32h are provided. As shown in FIG. 4, a recessed portion is formed in a bottom surface of the housing 31. On a slope surface of the recessed portion, a B button 32i is provided. The operation buttons 32a through 32i are each assigned various functions in accordance with the game program executed by the game apparatus 3. The power button 32h is for remote-controlling on or off a main body of the game apparatus 3. The home button 32f and the power button 32h each have a top surface thereof buried in the top surface of the housing 31, so as not to be inadvertently pressed by the player.

On a rear surface of the housing 31, a connector 33 is provided. The connector 33 is used for connecting the controller 5 to another device (for example, another controller).

On a rear part of the top surface of the housing 31, a plurality of (four in FIG. 3) LEDs 34a through 34d are provided. The controller 5 is assigned a controller type (number) so as to be distinguishable from the other controllers 5. For example, the LEDs 34a through 34d are used for informing the player of the controller type which is currently set to the controller 5 that he/she is using, or for notifying the remaining battery amount of the controller 5 to the player, for example. Specifically, when a game operation is performed using the controller 5, one of the plurality of LEDs 34a through 34d corresponding to the controller type is lit up.

Figure 5A:
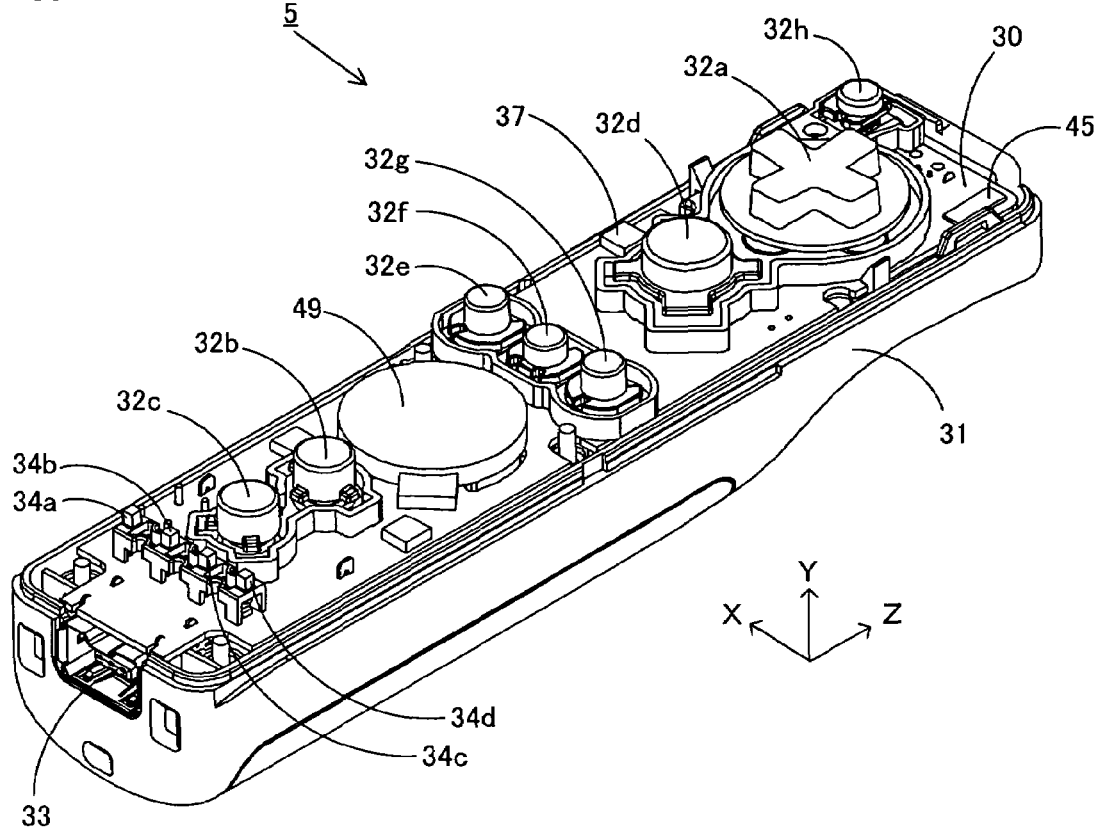
FIG. 5A is a view showing an internal structure of the controller 5.
Figure 5B:
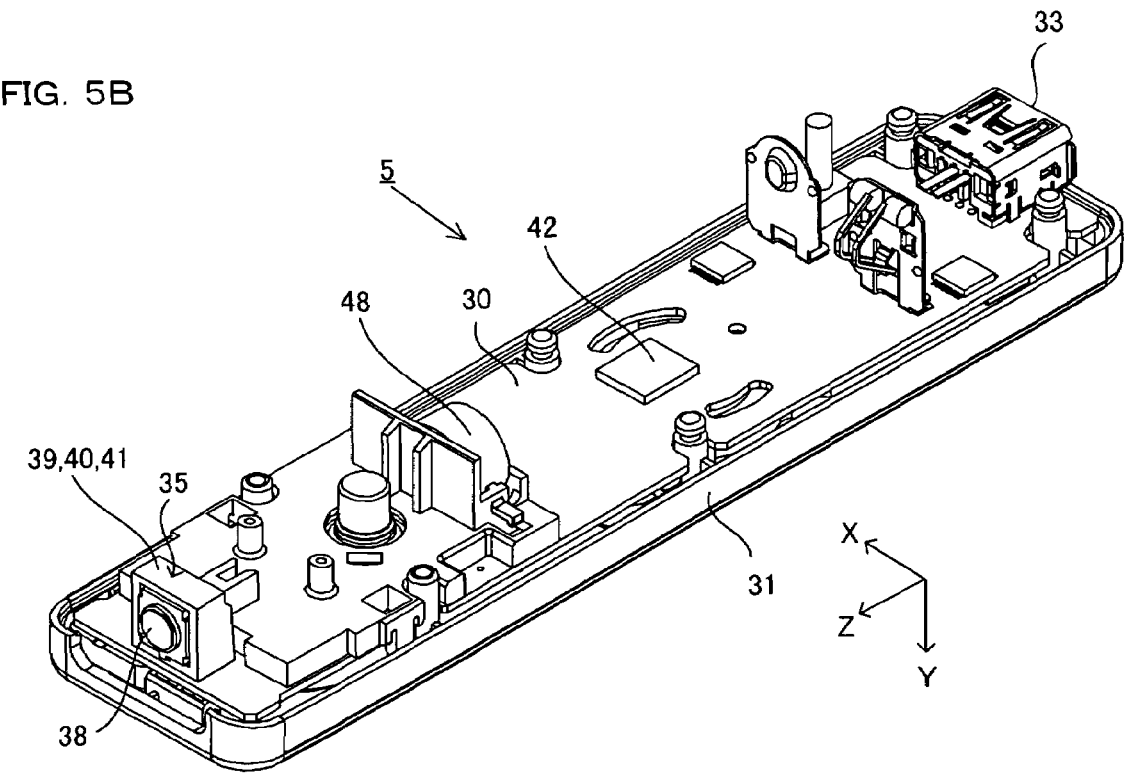
FIG. 5B is a view showing an internal structure of the controller 5.

The controller 5 includes an imaging information calculation section 35 (FIG. 5B). As shown in FIG. 4, a light incidence surface 35a of the imaging information calculation section 35 is provided on a front surface of the housing 31. The light incidence surface 35a is formed of a material which at least allows the infrared light from the markers 6R and 6L to pass therethrough. On the top surface of the housing 31, sound holes 31a for outputting a sound from a speaker 49 (FIG. 5A) built in the controller 5 are provided between the first button 32b and the home buttons 32f.

With reference to FIG. 5A and FIG. 5B, an internal structure of the controller 5 will be described. FIG. 5A and FIG. 5B each show an internal structure of the controller 5. FIG. 5A is an isometric view of the controller 5, illustrating a state where an upper casing (a part of the housing 31) of the controller 5 is removed. FIG. 5B is an isometric view of the controller 5, illustrating a state where a lower casing (a part of the housing 31) of the controller 5 is removed. FIG. 5B shows a reverse side of a substrate 30 shown in FIG. 5A.

As shown in FIG. 5A, the substrate 30 is fixed inside the housing 31. On a top main surface of the substrate 30, the operation buttons 32a through 32h, the LEDs 34a through 34d, an acceleration sensor 37, an antenna 45, the speaker 49 and the like are provided. These elements are connected to a microcomputer 42 (FIG. 5B) via lines (not shown) formed on the substrate 30 or the like. In this embodiment, the acceleration sensor 37 is located at a position offset from the center of the controller 5 in an X-axis direction. Thus, the motion of the controller 5 when rotating around the Z axis is made easy to calculate. The controller 5 acts as a wireless controller owing to a wireless module 44 (see FIG. 6) and the antenna 45.

As shown in FIG. 5B, at a front edge of a bottom main surface of the substrate 30, the image information calculation section 35 is provided. The image information calculation section 35 includes an infrared filter 38, a lens 39, an imaging element 40 and an image processing circuit 41 located in this order from the front surface of the controller 5. These elements 38 through 41 are attached to the bottom main surface of the substrate 30.

On the bottom main surface of the substrate 30, the microcomputer 42 and a vibrator 48 are provided. The vibrator 48 is, for example, a vibration motor or a solenoid. The vibrator 48 is connected to the microcomputer 42 via lines provided on the substrate 30 or the like. The controller 5 is vibrated by an actuation of the vibrator 48 in accordance with an instruction from the microcomputer 42. The vibration is conveyed to the player holding the controller 5. Thus, a so-called vibration-responsive game is realized. In this embodiment, the vibrator 48 is provided slightly forward with respect to the center of the housing 31, i.e., closer to the edge rather than at the center. Therefore, the entirety of the controller 5 is largely vibrated by the vibration of the vibrator 48. The connector 33 is attached to an rear edge of the main bottom surface of the substrate 30. The controller 5 includes a quartz oscillator for generating a reference clock of the microcomputer 42, an amplifier for outputting an audio signal to the speaker 49, and the like in addition to the elements shown in FIG. 5A and FIG. 5B.

The shape of the controller 5, the shape of each operation button, the number and the location of the acceleration sensor and the vibrator, and the like shown in FIG. 3, FIG. 4, FIG. 5A and FIG. 5B are merely illustrative, and may be variously altered without departing the scope of the certain exemplary embodiments disclosed herein. The imaging information calculation section 35 (the light incidence surface 35a thereof) may be provided on another surface as long as light is incident on the housing 31 from outside.

Figure 6:
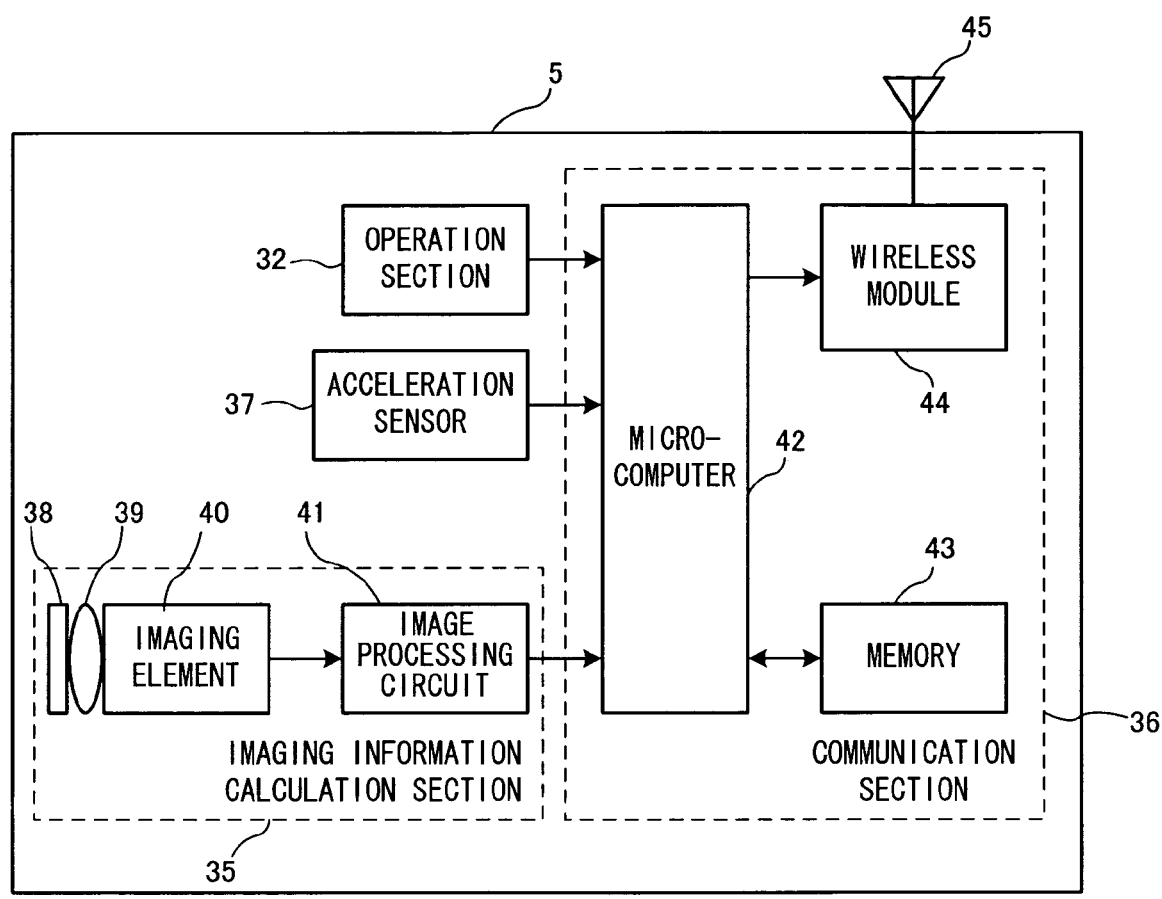
FIG. 6 is a block diagram illustrating a structure of the controller 5.

FIG. 6 is a block diagram showing the structure of the controller 5. The controller 5 includes an operation section 32 (operation buttons 32a through 32i), the connector 33, the imaging information calculation section 35, the communication section 36, and the acceleration sensor 37. The controller 5 transmits data in accordance with the posture thereof to the game apparatus 3 as transmission data.

The operation section 32 includes the operation buttons 32a through 32i, and outputs data representing an input state of each of the buttons 32a through 32i (whether or not each of the operation buttons 32a through 32i has been pressed) to the microcomputer 42 of the communication section 36.

The acceleration sensor 37 detects an acceleration (including the gravitational acceleration) of the controller 5, i.e., a force applied to the controller 5 (including the gravity). Among the accelerations applied on a detection section of the acceleration sensor 37, the accelerator 37 detects an acceleration value of a linear direction along a sensing axis (linear acceleration). For example, in the case where the acceleration sensor 37 is a multiple axial acceleration sensor having two or more axes, the accelerator 37 detects an acceleration of a component along each of the axes as the acceleration applied on the detection section thereof. Such a three- or two-axial acceleration sensor may be available from, for example, Analog Devices, Inc. or STMicroelectronics N.V.

In this embodiment, the acceleration sensor 37 detects a linear acceleration in each of three directions based on the controller 5, i.e., an up-down direction (Y-axis direction shown in FIG. 3), a left-right direction (X-axis direction shown in FIG. 3), and the front-rear direction (Z-axis direction shown in FIG. 3). The acceleration sensor 37 detects an acceleration along a straight line corresponding to each of the axes. Therefore, an output from the acceleration sensor 37 represents a linear acceleration value of each axis. Namely, the detected acceleration is provided as a three-dimensional vector in an XYZ coordinate system which is set for the controller 5. Hereinafter, a vector having, as components, the acceleration value of each of the three axes detected by the acceleration sensor 37 will be referred to as an "acceleration vector".

Data (acceleration data) representing the acceleration (acceleration vector) detected by the acceleration sensor 37 is output to the communication section 36. In this embodiment, the acceleration sensor 37 is used as a sensor for outputting data for calculating the strength of a swing of the controller 5. Namely, the game apparatus 3 calculates the strength of the swing of the controller 5 from the acceleration data, and executes the game processing in accordance with the strength of the swing. A method for calculating the strength of the swing of the controller 5 will be described later.

The imaging information calculation section 35 is a system for analyzing image data taken by the imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the imaging element 40 and the image processing circuit 41. The infrared filter 38 allows only infrared light to pass therethrough, among light incident on the front surface of the controller 5. The lens 39 collects the infrared light which has passed through the infrared filter 38 and outputs the infrared light to the imaging element 40. The imaging element 40 is a solid-state imaging device such as, for example, a CMOS sensor or a CCD sensor. The imaging element 40 receives the infrared light collected by the lens 39 and outputs an image signal. The markers 6R and 6L included in the sensor bar 6 provided in the vicinity of the display screen of the TV 2 are formed of infrared LEDs for outputting infrared light forward from the TV 2. Accordingly, owing to the infrared filter 38, the imaging element 40 generates image data only based on the infrared light which has passed through the infrared filter 38. Therefore, an accurate image of the markers 6R and 6L is generated. Hereinafter, an image taken by the imaging element 40 will be referred to as a "taken image". The image data generated by the imaging element 40 is processed by the image processing circuit 41. The image processing circuit 41 calculates the position of an imaging target (markers 6R and 6L) in the taken image. The image processing circuit 41 outputs a coordinate set representing the calculated position to the microcomputer 42 of the communication section 36. Data on the coordinate set is transmitted to the game apparatus 3 by the microcomputer 42 as operation data. Hereinafter, the coordinate set will be referred to as the "marker coordinate set". The marker coordinate set changes in accordance with the direction (posture) or the position of the controller 5. Therefore, the game apparatus 3 can calculate the direction or the position of the controller 5 using the marker coordinate set.

In this embodiment, the data on the marker coordinate set is not required for the game processing. Therefore, the controller 5 does not need to include the imaging information calculation section 35. In this case, the sensor bar 6 is not necessary. The communication section 36 includes the microcomputer 42, a memory 43, the wireless module 44, and the antenna 45. The microcomputer 42 controls the wireless module 44 for wirelessly transmitting the data obtained by the microcomputer 42 to the game apparatus 3, while using the memory 43 as a storage area during processing.

The data which is output to the microcomputer 42 from the operation section 32, the imaging information calculation section 35, and the acceleration sensor 37 is temporarily stored on the memory 43. The data is transmitted to the game apparatus 3 as the operation data. At the transmission timing to the communication unit 16, the microcomputer 42 outputs the operation data stored on the memory 43 to the wireless module 44. Using the Bluetooth (registered trademark) technology or the like, the wireless module 44 modulates a carrier wave of a predetermined frequency with the operation data, and radiates the obtained very weak radio signal from the antenna 45. Namely, the operation data is converted into a very weak radio signal by the wireless module 44 and transmitted from the controller 5. The very weak radio signal is received by the communication unit 16 of the game apparatus 3. The game apparatus demodulates or decodes the received very weak radio signal to obtain the operation data. Based on the obtained operation data and the game program, the CPU 10 of the game apparatus 3 performs the game processing. The wireless transmission from the communication section 36 to the communication unit 16 is performed at a predetermined cycle. Since the game processing is generally executed in units of 1/60 sec. (with 1/60 sec. being set as one frame), the transmission is preferably performed at a cycle of a shorter time period. The communication section 36 of the game controller 5 outputs the operation data to the game apparatus 3 at an interval of, for example, 1/200 sec.

Using the controller 5, the player can perform a game operation of swinging the controller 5 as a golf club, a baseball bat, or a tennis racket as well as a general conventional game operation of pressing the operation buttons.

(Game Examples)

Figure 7:
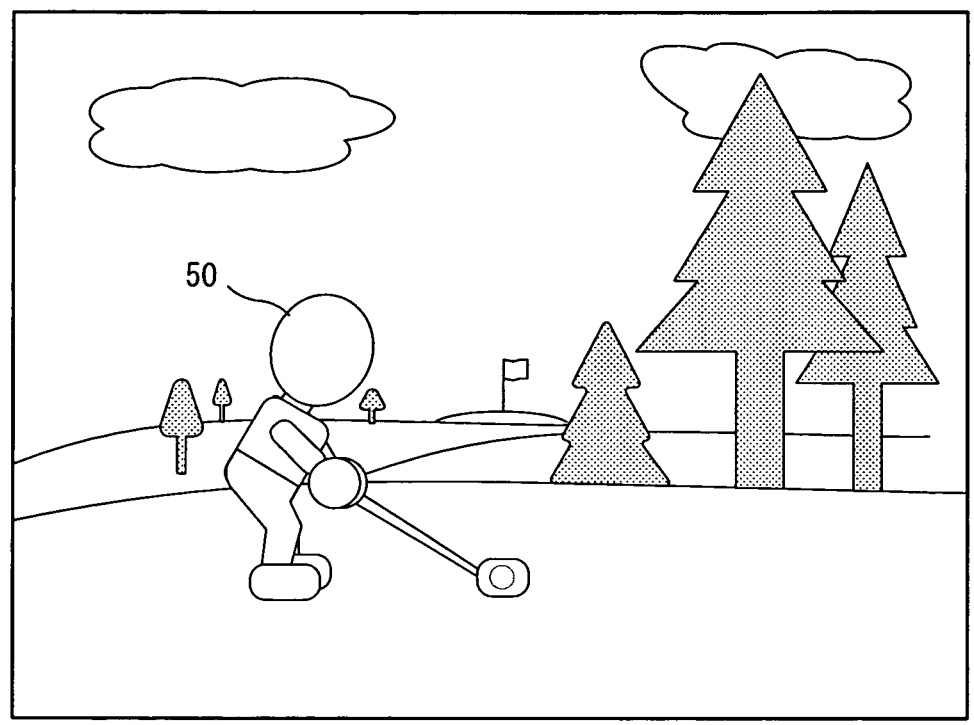
FIG. 7 shows an exemplary game image displayed on a TV 2 in a game according to a certain exemplary embodiment.
Figure 8:
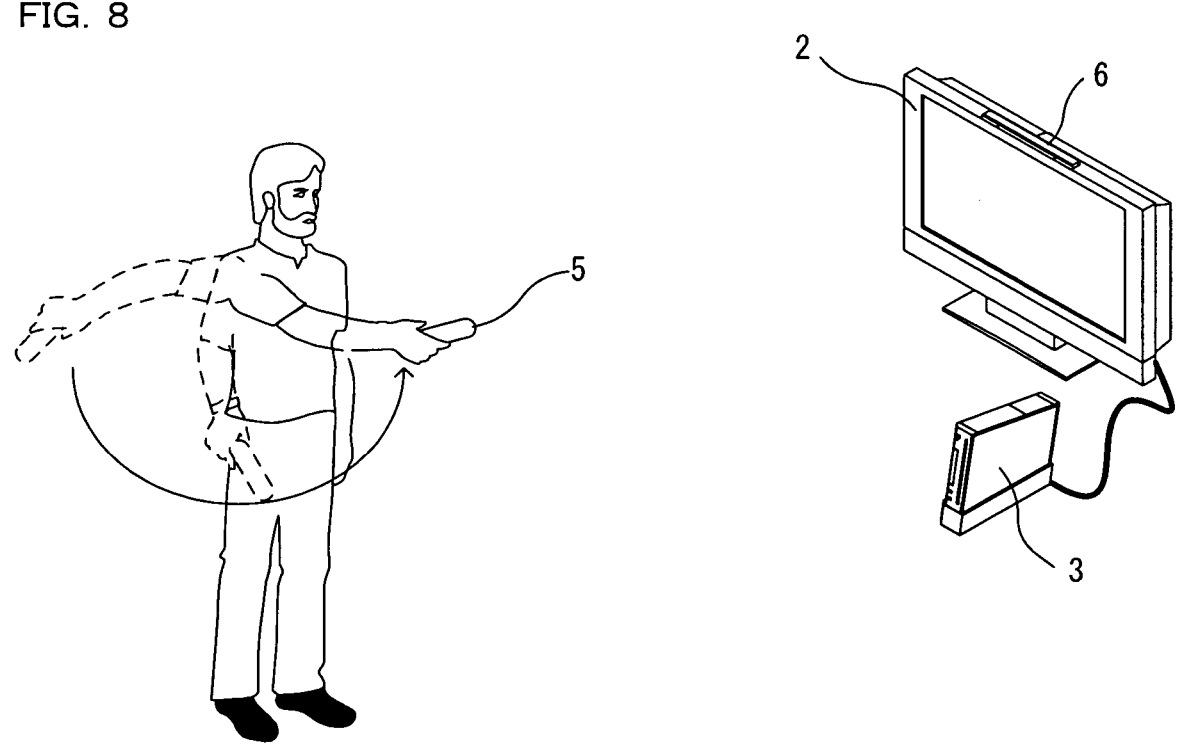
FIG. 8 shows how to perform a game operation using the controller 5.

With reference to FIG. 7 and FIG. 8, an exemplary game and game operation performed using the game apparatus 3 will be described. FIG. 7 shows an exemplary game image displayed on the TV 2 in this game. As shown in FIG. 7, this game is a golf game. A golf course constructed in a virtual game space and a player object 50 as a golf player appearing in the virtual game space are displayed on the screen. In this golf game, the player operates the player object 50 appearing in the virtual game space to play a virtual golf game.

FIG. 8 illustrates how to perform a game operation using the controller 5. For causing the player object 50 to swing the golf club in the golf game, the player performs a game operation of swinging the controller 5 as a golf club as shown in FIG. 7. Based on the acceleration data which is output from the acceleration sensor 37 of the controller 5, the game apparatus 3 calculates the strength of the swing (swing strength) of the controller 5 by the player. Based on the calculated swing strength, the game apparatus 3 calculates the flying distance (the strength of the swing by the player object 50) of the golf ball. Also, the game apparatus 3 displays, on the screen, the player object 50 swinging the golf club to make the golf ball fly (move) over the golf course. Thus, in this embodiment, the player handles the controller 5 as a golf club to perform a game operation. The player can play the game substantially as if he/she was playing golf. The game apparatus 3 may calculate the direction of the swing of the controller 5 in addition to the strength of the swing. The direction of the trajectory of the golf ball may be determined based on the direction of the swing.

(Details of the Game Processing)

Figure 9:
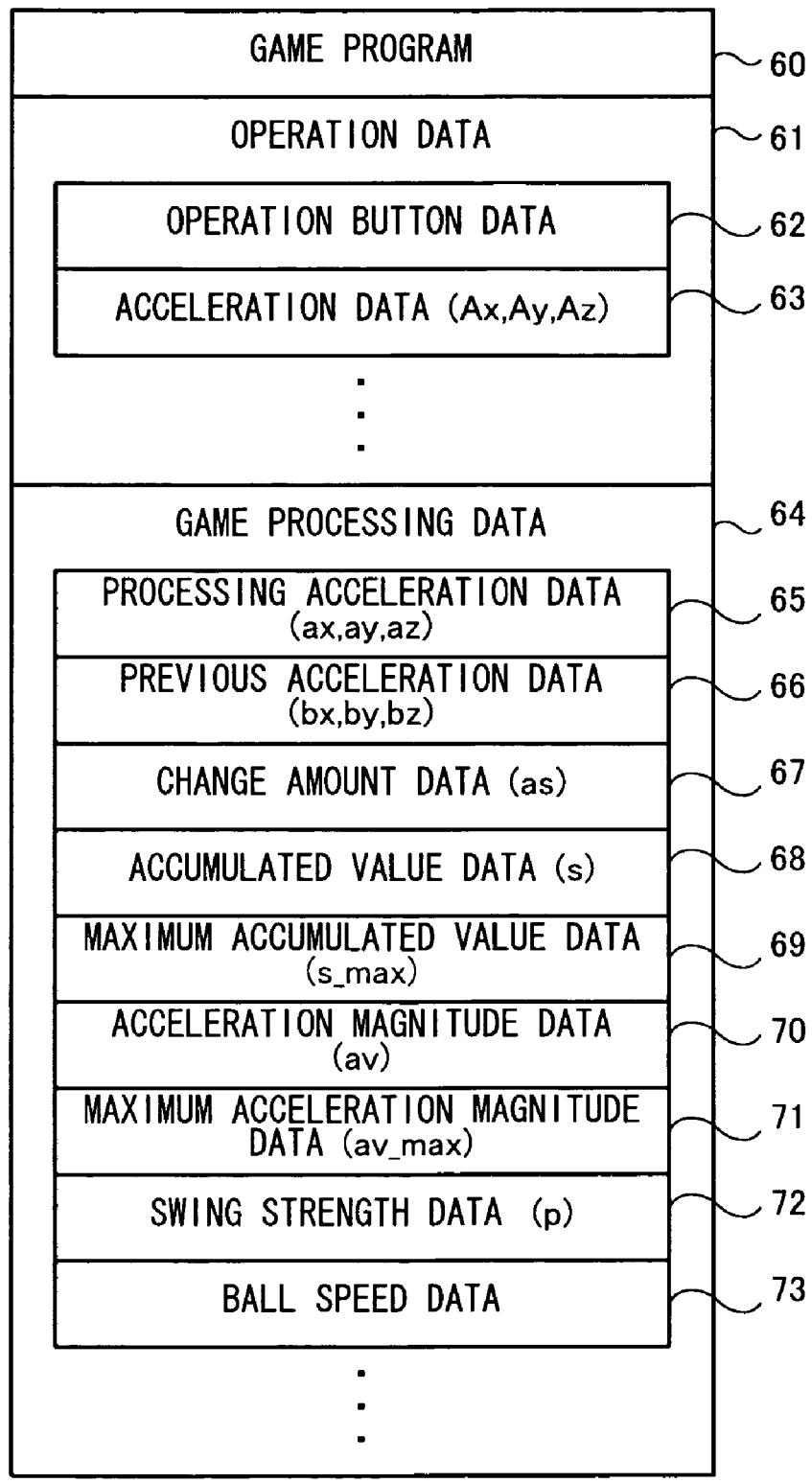
FIG. 9 shows main data stored on a main memory 13 of the game apparatus 3.

Next, the game processing executed by the game apparatus 3 in this embodiment will be described. First, main data used in the game processing will be described with reference to FIG. 9 and FIG. 10. FIG. 9 shows main data stored on the main memory 13 of the game apparatus 3. As shown in FIG. 9, the main memory 13 has stored thereon a game program 60, operation data 61, game processing data 64 and the like. The main memory 13 has also stored thereon image data of various objects appearing in the game, data representing various parameters of the objects, and other data required for the game in addition to the above-mentioned data.

At an appropriate timing after the game apparatus 3 is turned on, the game program 60 is partially or entirely read from the optical disc 4 and stored on the main memory 13. The game program 60 includes programs required, for example, for calculating the strength of a swing of the controller 5 and executing the game processing for controlling the movement of the ball in accordance with the calculated swing strength.

The operation data 61 is transmitted from the controller to the game apparatus 3. The operation data 61 includes operation button data 62 and acceleration data 63. The operation button data 62 represents operation particulars made on the buttons 32a through 32i of the operation section 32 (whether or not each of the operation buttons 32a through 32i has been pressed). The acceleration data 63 represents an acceleration (acceleration vector) detected by the acceleration sensor 37. Here, the acceleration data 63 represents an acceleration vector A=(Ax, Ay, Az) in the three axial directions of the XYZ coordinate system.

The game processing data 64 is used for the game processing described later (FIG. 11 through FIG. 14). The game processing data 64 includes processing acceleration data 65, previous acceleration data 66, change amount data 67, accumulated value data 68, maximum accumulated value data 69, acceleration magnitude data 70, maximum acceleration magnitude data 71, swing strength data 72, ball speed data 73, and the like. In this specification, the term "previous" refers to "immediately previous".

The processing acceleration data 65 is obtained by processing the acceleration data 63 for the game processing. Specifically, the processing acceleration data 65 represents a three-dimensional vector ax=(ax, ay, az) which changes so as to follow the acceleration vector represented by the acceleration data 63. Hereinafter, a vector represented by the processing acceleration data 65 will be referred to as a "processing acceleration vector" so as to be distinguishable from the acceleration vector represented by the acceleration data 63. A method for calculating the processing acceleration vector will be described later. In this embodiment, the processing acceleration data 65 is calculated repeatedly at a ratio of once in a predetermined time period during a swing period. Here, the "swing period" is the time period from the player starts swinging until the player finishes swinging. A method for determining the swing period will be described later. The predetermined time period may be the time period required for the operation data to be transmitted from the controller 5 to the game apparatus 3 (1/200 sec.) or one frame time (a time unit for generating and displaying one game image; 1/60 sec. in this embodiment).

The previous acceleration data 66 is the immediately previous processing acceleration data (different from the acceleration data included in the operation data). Namely, the previous acceleration data 66 is processing acceleration data which is generated immediately previously to the latest processing acceleration data. Herein, an acceleration vector represented by the previous acceleration data 66 will be referred to as the "previous acceleration vector (bx=(bx, by, bz))".

Figure 10:
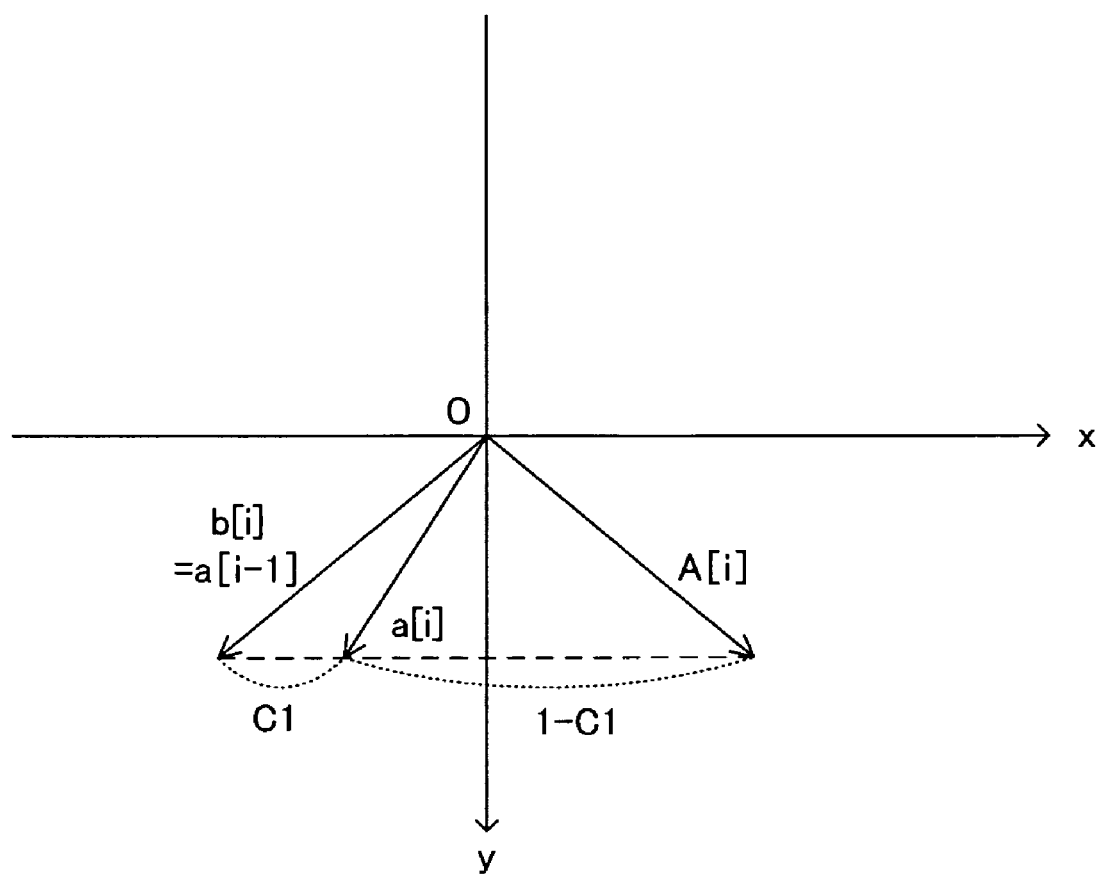
FIG. 10 shows a method for calculating a processing acceleration vector.

FIG. 10 shows a method for calculating the processing acceleration vector. In this embodiment, the acceleration vector, the processing acceleration vector and the previous acceleration vector are three-dimensional vectors. In FIG. 10, these are explained as two-dimensional vectors for the sake of simplicity. The i'th (i is an integer of 1 or greater) processing acceleration vector a[i] after the start of the swing period is calculated based on the current acceleration vector A[i] and the previous acceleration vector b[i] (=a[i−1]). In FIG. 10, the start point of each of the vectors A[i], a[i] and b[i] is the origin of the coordinate system shown in FIG. 10. Specifically, the termination point of the processing acceleration vector a[i] is a point which internally divides a line segment connecting the termination point of the previous acceleration vector b[i] and the termination point of the current acceleration vector A[i] at C1: (1−C1). In other words, the processing acceleration vector a[i] is a vector obtained by making closer the previous acceleration vector b[i] toward the current acceleration vector A[i] at a predetermined ratio (C1).

Returning to FIG. 9, the change amount data 67 represents a change amount "as" of the acceleration vector represented by the processing acceleration data. Specifically, the change amount data 67 represents a change amount from the previous processing acceleration data to the latest processing acceleration vector. More specifically, the change amount data 67 represents a magnitude of a differential vector between the previous processing acceleration vector and the latest processing acceleration vector (see expression (2) described later). The change amount data 67 is calculated based on the processing acceleration data 65 and the previous acceleration data 66. The change amount data 67 is calculated each time the processing acceleration data 65 is calculated.

The accumulated value data 68 represents a value obtained by accumulating the change amounts calculated during the swing period. A method for calculating the accumulated value will be described later. The accumulated value data 68 is calculated each time the change amount data 67 is calculated.

The maximum accumulated value data 69 represents the maximum value of the accumulated values (maximum accumulated value s_max) calculated during the swing period. In this embodiment, the maximum accumulated value is used for calculating the swing strength of the controller 5.

The acceleration magnitude data 70 represents the magnitude "av" of the processing acceleration vector which is represented by the processing acceleration data 65. In this embodiment, the acceleration magnitude data 70 is calculated repeatedly at an interval of one frame during the swing period, like the processing acceleration data 65. In another embodiment, the acceleration magnitude data 70 may represent the magnitude of the acceleration vector represented by the acceleration data 63 which is output from the acceleration sensor 37.

The maximum acceleration magnitude data 71 represents the maximum magnitude of the processing acceleration vector magnitudes "av" (maximum acceleration magnitude av_max) calculated during the swing period. In this embodiment, the maximum acceleration magnitude is used for calculating the swing strength of the controller 5.

The swing strength data 72 represents the swing strength "p" of the controller 5. The particular of the swing strength data 72 is reflected on the game result (specifically, the flying distance of the golf ball). In this embodiment, the swing strength data 72 is calculated based on the maximum accumulated value data 69 and the maximum acceleration magnitude data 71.

The ball speed data 73 represents the speed of the golf ball. In this embodiment, the particular of the ball speed data 73 is updated based on the swing strength data 72. In accordance with the ball speed data 73, the ball is displayed as moving on the screen. On the main memory 13, data representing the position or the like of the ball in the game space is stored as other data regarding the ball.

Figure 11:
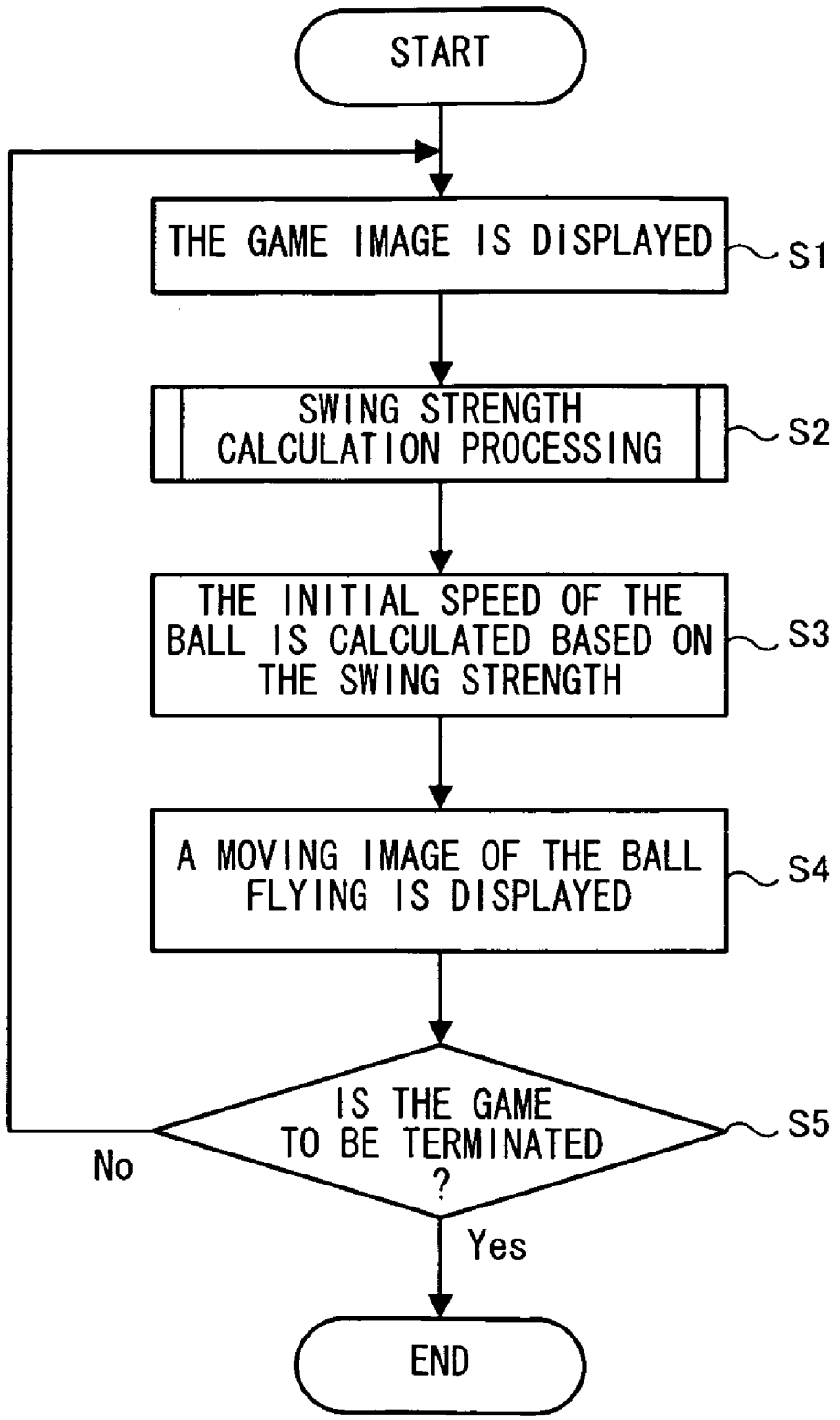
FIG. 11 is a main flowchart illustrating a flow of the processing executed by the game apparatus 3.

Next, the game processing executed by the game apparatus 3 will be described in detail with reference to FIG. 11 through FIG. 14. FIG. 11 is a main flowchart illustrating a flow of the processing executed by the game apparatus 3. When the power of the game apparatus 3 is turned on and the optical disc 4 having the game program stored thereon is inserted into the game apparatus 3, the CPU 10 of the game apparatus 3 executes a start program stored on a boot ROM (not shown) to initialize the elements including the main memory 13. The game program stored on the optical disc 4 is read into the main memory 13, and the CPU 10 starts execution of the game program. The processing shown in FIG. 11 is executed after the above-described processing is completed. Hereinafter, the processing on calculation of the swing strength of the controller 5 will be mainly described. The processing which is not directly relevant to the exemplary embodiments will be omitted.

Referring to FIG. 11, in step S1, the CPU 10 displays a game image. In step S1, an image including the golf course constructed in the virtual game space and the player object 50 appearing in the golf course is generated, and the generated image is displayed on the screen of the TV 2. Typically, as shown in FIG. 7, an image of the player object 50 starting a swing (a state of the player object 50 starting addressing) is generated and displayed. After this, the player starts a game operation of causing the player object 50 to swing, i.e., an operation of swinging the controller 5.

Next in step S2, the CPU 10 executes swing strength calculation processing. The swing strength calculation processing is executed for calculating a swing strength of the controller 5. Hereinafter, with reference to FIG. 12, the swing strength calculation processing will be described in detail.

Figure 12:
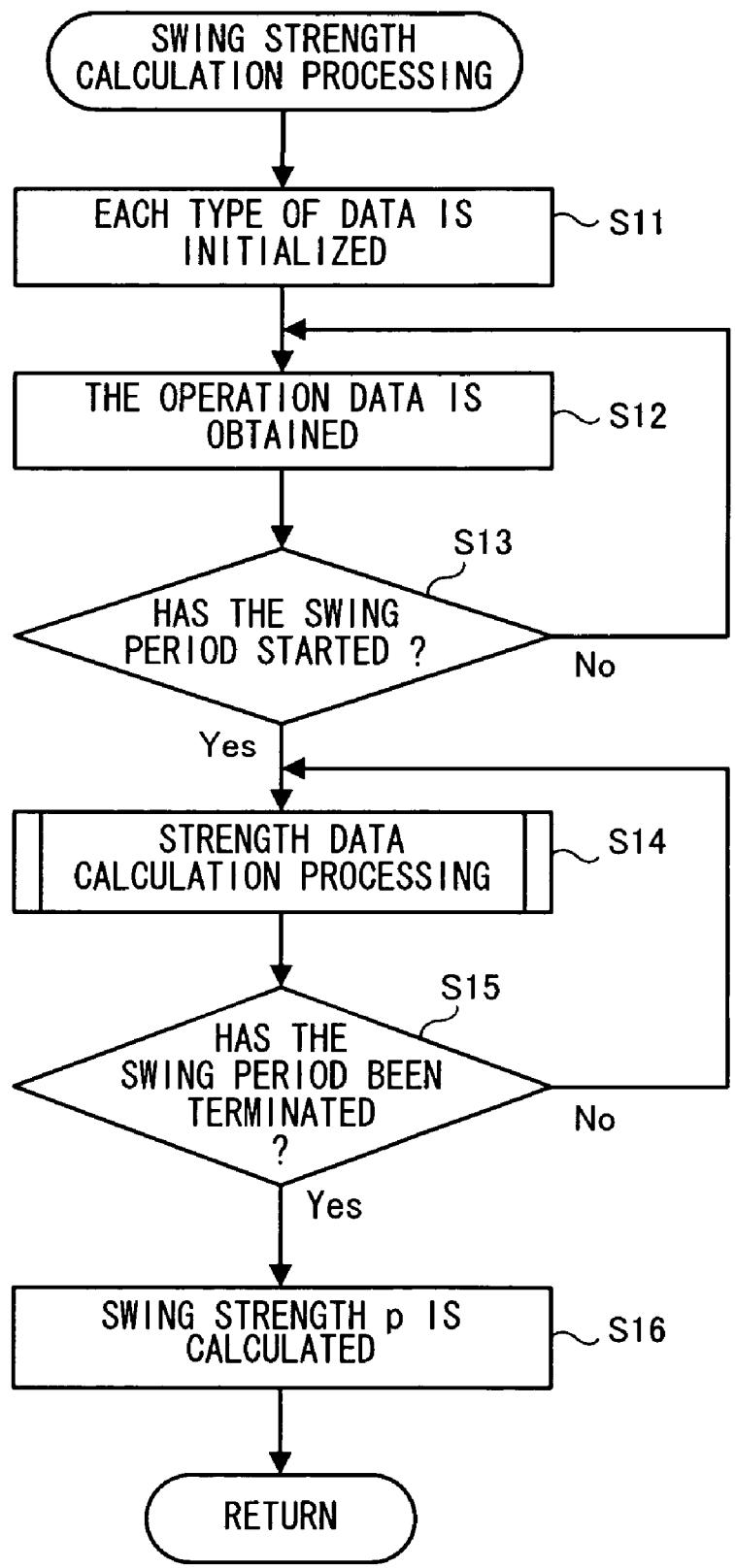
FIG. 12 is a flowchart illustrating a flow of swing strength calculation processing in step S2 shown in FIG. 11.

FIG. 12 is a flowchart illustrating a flow of the swing strength calculation processing (step S2) shown in FIG. 11. The swing strength calculation processing is executed as follows. First in step S11, the CPU 10 initializes data 65 through 73 used for the swing strength calculation processing. Specifically, the processing acceleration data 65 is set so as to represent (ax, ay, az)=(0, 0, 0). The previous acceleration data 66 is set so as to represent (bx, by, bz)=(0, 0, 0). The accumulated value data 68, the maximum accumulated data 69 and the maximum acceleration magnitude data 71 are set to represent "0" as an initial value. After step S11, processing in step S12 is executed.

In step S12, the CPU 10 obtains operation data from the controller 5. In more detail, the communication unit 16 receives the operation data transmitted from the controller 5, and the received operation data is stored on the main memory 13. Thus, the operation button data 62 representing the current operation state on the buttons and the acceleration data 63 representing the current acceleration of the controller 5 are stored on the main memory 13. The main memory 13 stores only the newest (latest) operation data.

Next in step S13, the CPU 10 determines whether or not the swing period has started. In this embodiment, the determination in step S13 is made based on whether or not a predetermined button of the controller 5 (for example, the A button 32*d*) is being pressed. As described later in step S15 in more detail, the swing period is terminated when the predetermined button is released. Namely, in this embodiment, the time period while the predetermined button is in a pressed state is the swing period. Thus, such a situation can be avoided that the swing period starts and the player object 50 performs a swing motion without the intention of the player.

When the determination result in step S13 is negative, the processing in step S12 is executed again. Namely, the processing in steps S12 and S13 is repeated until it is determined in step S13 that the swing period has started. Therefore, the CPU 10 waits until the swing period starts. By contrast, when the determination result in step S13 is positive, processing in step S14 is executed.

In step S14, the CPU 10 executes strength data calculation processing. The strength data calculation processing is executed for obtaining data on the swing strength. Hereinafter, with reference to FIG. 13, the strength data calculation processing will be described in detail.

Figure 13:
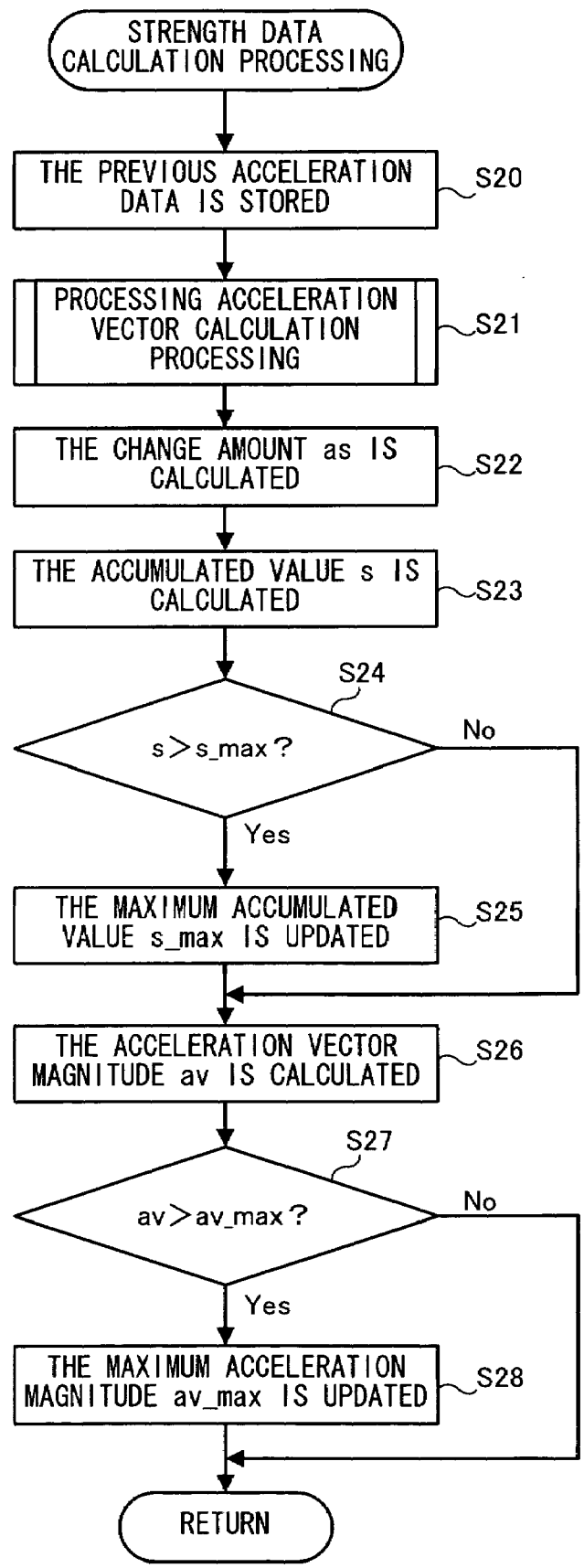
FIG. 13 is a flowchart illustrating a flow of strength data calculation processing in step S14 shown in FIG. 12.

FIG. 13 is a flowchart illustrating a flow of the strength data calculation processing (step S14) shown in FIG. 12. The strength data calculation processing is executed as follows. First in step S20, the CPU 10 stores the previous acceleration data on the main memory 13. Specifically, the processing acceleration data 65 which is currently stored on the main memory 13 is stored on the main memory 13 as previous acceleration data 66. The main memory 13 stores only the latest previous acceleration data.

Next in step S21, the CPU 10 executes processing acceleration vector calculation processing. Hereinafter, with reference to FIG. 14, the processing acceleration vector calculation processing will be described in detail.

Figure 14:
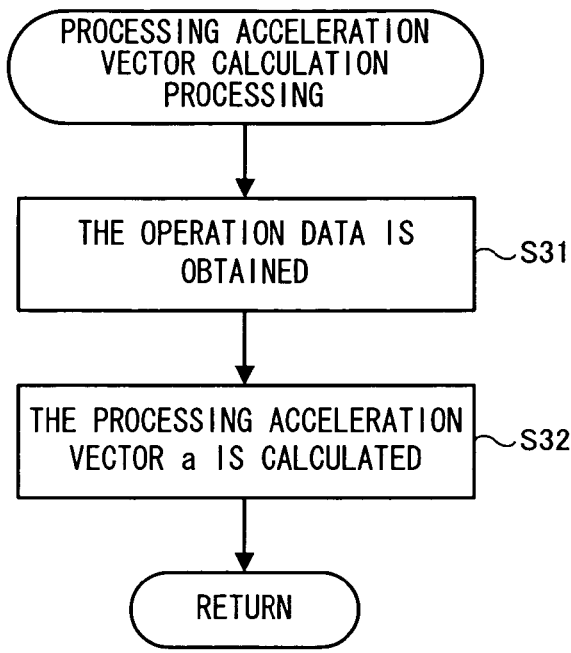
FIG. 14 is a flowchart illustrating a flow of processing vector calculation processing in step S21 shown in FIG. 13.

FIG. 14 is a flow chart illustrating a flow of the processing acceleration vector calculation processing (step S21) shown in FIG. 13. The processing acceleration vector calculation processing is executed as follows. First in step S31, the CPU 10 obtains operation data. The processing in step S31 is the same as that in step S12. In this embodiment, the strength data calculation processing (step S14) is executed once in a predetermined time period (at an interval of the operation data transmission time or at an interval of one frame time). Thus, by the processing in step S31, the operation data is obtained at an interval of the predetermined time period repeatedly.

Next in step S32, the CPU 10 calculates a processing acceleration vector "a". The processing acceleration vector "a" is calculated using the acceleration data 63 and the previous acceleration data 66 stored on the main memory 13, such that the processing acceleration vector "a" follows the acceleration vector represented by the acceleration data 63 (see FIG. 10). Specifically, the processing acceleration vector a=(ax, ay, az) is calculated in accordance with the following expression (1), where the acceleration vector represented by the acceleration data 63 is (Ax, Ay, Az) and the previous acceleration vector represented by the previous acceleration data 66 is (bx, by, bz).

$$ax=bx+(Ax-bx)\cdot C1$$

$$ay=by+(Ay-by)\cdot C1$$

$$az=bz+(Az-bz)\cdot C1 \quad (1)$$

In expression (1), constant C1 is preset in the range of 0<C1<1. Data representing the processing acceleration vector calculated in step S32 is stored on the main memory as the processing acceleration data 65. The main memory 13 stores only the latest processing acceleration data. After step S32, the CPU 10 terminates the processing acceleration vector calculation processing shown in FIG. 14 (step S21 in FIG. 13).

In another embodiment, the CPU 10 may use the acceleration data represented by the acceleration data 63 as the processing acceleration data with no specific processing. Namely, the processing acceleration data 65 may be the same as the acceleration data 63. In this case, processing in step S32 is not necessary.

Returning to FIG. 13, in step S22 after step S21, the CPU 10 calculates a change amount "as". The change amount "as" is calculated using the processing acceleration data 65 and the previous acceleration data 66 stored on the main memory 13. Specifically, the change amount "as" is calculated in accordance with the following expression (2).

$$as=((ax-bx)^2+(ay-by)^2+(az-bz)^2)^{1/2} \quad (2)$$

Data representing the change amount "as" calculated in step S22 is stored on the main memory 13 as the change amount data 67. The main memory 13 stores only the latest change amount data.

Next in step S23, the CPU 10 calculates the accumulated value "s". The accumulated value "s" is calculated using the change amount data 67 and the accumulated value data 68 which are currently stored on the main memory 13. Specifically, the new accumulated value "s" is calculated in accordance with the following expression (3), where the change amount represented by the change amount data 67 is "as" and the accumulated value represented by the accumulated value data 68 is "s'".

$$s=s'\cdot C2+as \quad (3)$$

In expression (3), variable "s'" is the accumulated value calculated in step S23 in the previous cycle of strength data calculation processing. When the strength data calculation processing is executed for the first time, variable "s'" is 0, i.e., the value set as the initial value in step S1. Constant C2 is preset in the range of 0<C2<1. As understood from expression (3), the accumulated value "s" may be smaller than the previous accumulated value "s'" depending on the value of the change amount "as". In expression (3), instead of multiplying variable "s'" by coefficient C2, a predetermined value may be subtracted from variable "s'". Data representing the accumulated value "s" calculated in step S23 is stored on the main memory 13 as the accumulated value data 68. The main memory 13 stores only the latest accumulated value data.

In another embodiment, the accumulated value "s" only needs to be a value obtained by calculation performing using the change amounts calculated during the swing period. For example, the accumulated value "s" may simply be a sum of all the change amounts. Namely, in expression (3), C2 may be 1. In still another embodiment, C2 may be 0 in expression (3).

Next in step S24, the CPU 10 determines whether or not the accumulated value "s" calculated in step S23 is larger than the maximum accumulated value s_max. The determination in step S24 is made by comparing the accumulated value "s" represented by the accumulated value data 68 stored on the main memory 13 and the maximum accumulated value s_max represented by the maximum accumulated value data 69 stored on the main memory 13. The processing in step S24 is executed for determining whether or not to update the maximum accumulated value. When the determination in step S24 is positive, processing in step S25 is executed. By contrast, when the determination in step S24 is negative, step S25 is skipped and processing in step S26 is executed.

In step S25, the CPU 10 updates the maximum accumulated value s_max. Namely, the CPU 10 stores the current accumulated value data 68 as the maximum accumulated value data 69. The main memory 13 stores only the latest maximum accumulated value data. Thus, the maximum accumulated value is updated to the accumulated value calculated in the current cycle of strength data calculation processing. Then, processing in step S26 is executed.

By the processing in steps S21 through S25, the accumulated value "s" is calculated. The maximum accumulated value s_max may be updated under a certain condition. As described later in detail, the swing strength value "p" is calculated based on the maximum accumulated value s_max.

In step S26, the CPU 10 calculates the processing acceleration vector magnitude "av". The processing acceleration vector magnitude "av" is calculated based on the processing acceleration vector (ax, ay, az) represented by the processing acceleration data 65 stored on the main memory 13. Specifically, the processing acceleration vector magnitude "av" is calculated in accordance with the following expression (4).

$$av=((ax)^2+(ay)^2+(az)^2)^{1/2} \quad (4)$$

Data representing the processing acceleration vector magnitude "av" calculated in step S26 is stored on the main memory as the acceleration magnitude data 70. The main memory 13 stores only the latest acceleration magnitude data. In this embodiment, the processing acceleration vector magnitude is calculated, but instead, the acceleration vector magnitude represented by the acceleration vector data 63 may be calculated.

Next in step S27, the CPU 10 determines whether or not the processing acceleration vector magnitude "av" calculated in step S26 is larger than the maximum acceleration magnitude s_max. The determination in step S27 is made by comparing the processing acceleration vector magnitude "av" represented by the acceleration magnitude data 70 stored on the main memory 13 and the maximum acceleration magnitude av_max represented by the maximum acceleration data 71 stored on the main memory 13. The processing in step S27 is executed for determining whether or not to update the maximum acceleration value. When the determination in step S27 is positive, processing in step S28 is executed. By contrast, when the determination in step S27 is negative, the CPU 10 terminates the strength calculation processing.

In step S28, the CPU 10 updates the maximum acceleration magnitude av_max. Namely, the CPU 10 stores the current acceleration magnitude data 70 as the maximum acceleration magnitude data 71. The main memory 13 stores only the latest maximum acceleration magnitude data. Thus, the maximum acceleration magnitude is updated to the acceleration magnitude calculated in the current cycle of strength data calculation processing. After step S28, the CPU 10 terminates the strength calculation processing.

Returning to FIG. 12, after the strength data calculation processing in step S14, processing in step S15 is executed. In step S15, the CPU 10 determines whether or not the swing period has been terminated. In this embodiment, the determination in step S15 is made based on whether or not the predetermined button of the controller 5 which was pressed to start the swing period was released. In this embodiment, the time period while the predetermined button is in a pressed state is the swing period. Thus, such a situation can be avoided that the swing period starts and the player object 50 performs a swing motion without the intention of the player. When the determination result in step S15 is negative, the processing in step S14 is repeated. Namely, during the swing period, the strength data calculation processing is repeated at an interval of a predetermined time period. By contrast, when the determination result in step S15 is positive, processing in step S16 is executed.

In another embodiment, the CPU 10 may set the swing period based on the pressing state of a predetermined button. For example, the CPU 10 may start the swing period when a predetermined button is pressed, and may terminate the swing period when the predetermined button is pressed again.

The determination in step S13 may be made based on whether or not the acceleration vector magnitude detected by the acceleration sensor 37 is equal to or larger than a predetermined value. More specifically, in step S13, the CPU 10 may determine that the swing period has started when the acceleration vector magnitude represented by the acceleration data 63 (acceleration data included in the operation data obtained in step S12) stored on the main memory 13 is equal to or larger than a predetermined value. In this case, the swing period is terminated when the acceleration vector magnitude becomes smaller than the predetermined value. Namely, in step S15, the CPU 10 may determine that the swing period has terminated when the acceleration vector magnitude represented by the acceleration vector data 63 stored on the main memory 13 is less than a predetermined value. In this case also, such a situation can be avoided that the swing period starts without the intention of the player. Instead of the acceleration vector, the processing acceleration vector may be used. The swing strength "p" may be calculated each time the strength data calculation processing is executed, and the swing period may be terminates when the swing strength "p" is reduced to smaller than a predetermined value.

In step S16, the CPU 10 calculates the swing strength "p" of the controller 5. The swing strength "p" is calculated using the maximum accumulated value data 69 and the maximum acceleration magnitude data 71 stored on the main memory 13. Specifically, the swing strength "p" is calculated in accordance with the following expression (5).

$$p = s\_max \cdot av\_max \quad (5)$$

Data representing the swing strength "p" calculated in step S16 is stored on the main memory 13 as the swing strength data 72. The main memory 13 stores only the latest swing strength data. The swing strength "p" may be calculated by other methods. The swing strength "p" only needs to be calculated so as to increase as the maximum accumulated value s_max is larger and also as the maximum acceleration magnitude av_max is larger. For example, the swing strength "p" may be calculated by adding a maximum accumulated value s_max and a maximum acceleration magnitude av_max, which are both weighted as predetermined. After step S16, the CPU 10 terminates the swing strength calculation processing shown in FIG. 12.

Returning to FIG. 11, in step S3 after step S2, the CPU 10 calculates the initial speed of the ball based on the swing strength "p" of the controller 5. The initial speed of the ball is calculated so as to be larger as the swing strength "p" is greater. The swing strength "p" is learned by referring to the swing strength data 72 stored on the main memory 13. Data representing the initial speed of the ball calculated in step 3 is stored on the main memory 13 as the ball initial speed data 73.

Next in step S4, the CPU 10 displays, on the screen of the TV 2, a moving picture of the ball moving based on the initial speed calculated in step S3. Namely, the CPU 10 controls the movement of the ball such that the ball moves at the initial speed in a predetermined direction. At this point, the movement of the ball is controlled in consideration of the physical conditions such as the gravity, the direction of the wind and the like. The predetermined direction may be determined based on the direction in which the controller 5 is swung. As a result of the control on the movement of the ball, the trajectory of the ball from when the ball starts moving from the current position until the ball stops is determined. The game image is generated such that the ball moves along the determined trajectory, and displayed.

Next in step S5, the CPU 10 determines whether or not to terminate the game. The determination in step S5 is made based on, for example, whether or not the one round has been finished, or the player has made an instruction to terminate the game. When the determination result in step S5 is negative, the processing is returned to step S1 and the above-described processing is repeated. By contrast, when the determination result in step S5 is positive, the CPU 10 terminate the game processing shown in FIG. 11.

In this embodiment, as described above, when the player swings the controller 5 during the game, the acceleration of the controller 5 (acceleration vector) is changed. For example, when the controller 5 makes a uniform circular motion, there is no change in the acceleration vector detected by the acceleration sensor 37. However, when the player (human) actually swings the controller 5, the motion of the controller 5 is not a uniform circular motion for the reasons of, for example, (a) the trajectory is not accurately an arc; (b) the speed during the swing is not uniform; and (c) the controller 5 is also twisted (rotated around the axis along the front-rear direction of the controller 5). Accordingly, while the acceleration vector is changing, it can be determined that the controller 5 is being swung.

In this embodiment, the change amount of the acceleration vector is calculated (step S22), the accumulated value of the change amounts is calculated (step S23), and the accumulated value is reflected on the swing strength (in the above game processing, the maximum accumulated value s_max is reflected on the swing strength "p"). Therefore, as the time period in which the acceleration vector is changing is longer, the number of times that the change amounts are accumulated is larger. As a result, the swing strength "p" is greater. Namely, in the above game processing, as the time period in which the controller 5 is being swung is longer, i.e., as the stroke of the swing of the controller 5 is longer, the swing strength is greater. Thus, in this game processing, the length of the stroke of the swing of the controller 5 can be reflected on the swing strength.

In the above game processing, the accumulated value is larger as the change amount of the acceleration vector is larger. Therefore, as the change amount of the acceleration vector is larger, the swing strength is greater. While the controller 5 is being swung faster, the change amount of the acceleration vector is larger. As a result, the calculated swing strength is also greater. Namely, in the above game processing, as the controller 5 is swung faster, the swing strength is greater. The speed of the swing of the controller 5 can be reflected on the swing strength.

As described above, in this embodiment, the swing strength which reflects the length of the stroke and the speed of the swing of the controller 5 can be calculated. Owing to this, the swing strength can be different when the controller 5 is swung faster from when the controller 5 is swung more slowly, even if the length of the stroke is the same. Also, the swing strength can be different when the stroke of the swing is longer from when the stroke of the swing is shorter, even if the speed of the swing is the same. By adjusting constants C1 and C2, the swing strength may be made substantially equal when the controller 5 is swung faster with a shorter stroke and when the controller 5 is swung more slowly with a longer stroke. As described above, in this embodiment, the length of the stroke and the speed of the swing can both be reflected on the swing strength, and thus the swing strength can be calculated more accurately.

In the above game processing, in step S21, the processing acceleration vector is calculated from the acceleration vector detected by the acceleration sensor 37, and the processing acceleration vector is used for calculating the accumulated value. Depending on the performance of the acceleration sensor 37, when the acceleration applied on the controller 5 is too large, the acceleration vector may exceed the detection limit of the acceleration sensor 37. When the controller 5 is swung rapidly, the acceleration applied on the controller 5 during the swing is excessively large. As a result, the acceleration may exceed the detection limit of the acceleration sensor 37 for the majority of the swing period. In such a case, the change amount of the acceleration vector is represented as "0" for the majority of the swing period. If the change amount of the acceleration vector is used without being processed to calculate the accumulated value of the change amounts, the accumulated value may not increase because the change amount may be "0". In this case, the swing strength cannot be calculated accurately.

In the above game processing, the change amount of the processing acceleration vector which changes so as to follow the acceleration vector, not the change amount of the acceleration vector, is used. Even if the controller 5 is rapidly swung, the change amount of the processing acceleration vector is unlikely to be "0". Therefore, even in the above-mentioned case, the accumulated value increases, and thus the swing strength can be calculated more accurately.

In the above game processing, the accumulated value "s" is not a simple sum of the change amounts "as", but is a sum of a value obtained by multiplying the previous accumulated value "s'" by a predetermined coefficient C2 (0<C2<1) and the current change amount "as" (expression (3)). In addition, the maximum accumulated value s_max, not the accumulated value "s", is used to calculate the swing strength "p" (step S16). Owing to this, even when the movement of the controller 5 substantially stops during the swing period, the swing strength can be calculated accurately. Hereinafter, with reference to FIG. 15, the reason will be described in detail.

Figure 15:
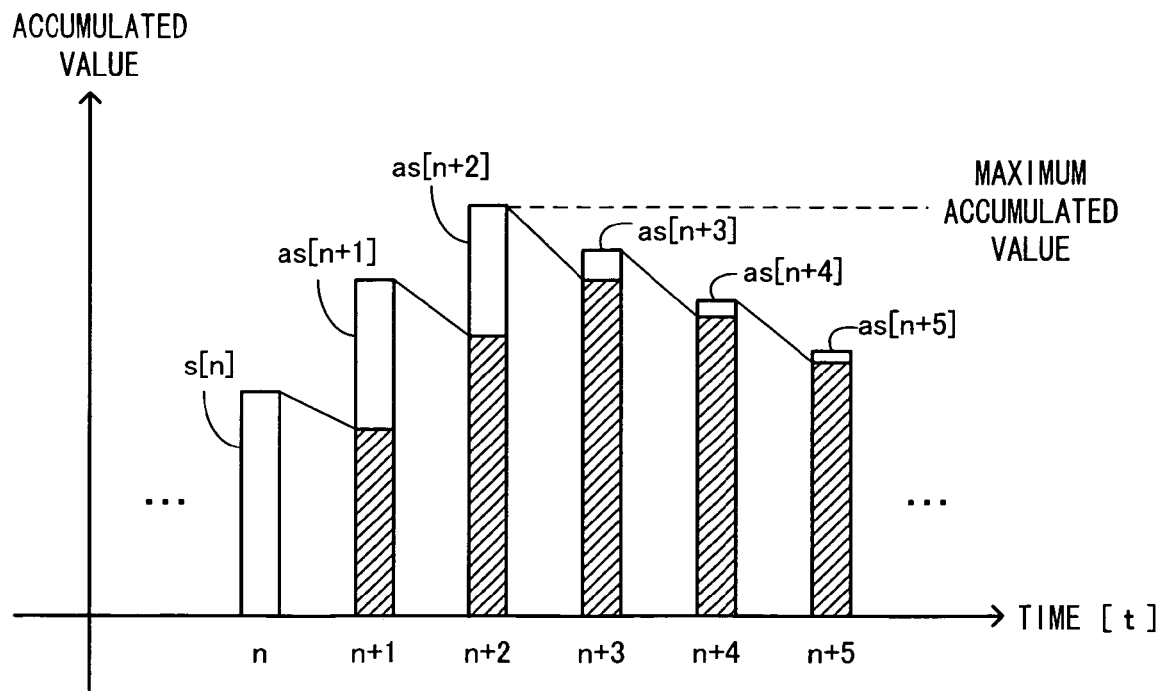
FIG. 15 shows a graph illustrating an example of transition of the accumulated value "s" and the maximum accumulated value as max.

FIG. 15 is a graph showing an exemplary transition of the accumulated value "s" and the maximum accumulated value s_max. The vertical axis of the graph represents the accumulated value "s". The horizontal axis of the graph represents the time t in which the strength data calculation processing is executed. The unit time is the time period in which one cycle of strength data calculation processing is executed. FIG. 15 shows the transition of the accumulated value from one point in time t=n (n is an integer of 1 or greater) to another point in time t=n+5. As shown in FIG. 15, the accumulated value s[j+1] at time t=j+1 (j=n through n+4) is a sum of s[j] multiplied by coefficient (=C2) and the change amount as[j+1] at time t=j+1.

When the change amount "as" is larger than a reference value, as at time t=n through n+2, the accumulated value "s" is larger than the previous accumulated value. Thus, the maximum accumulated value is updated. In the above game processing, the reference value is obtained by multiplying the previous accumulated value by (1−C2). By contrast, when the change amount "as" is smaller than the reference value, as at time t=n+3 through n+5, the accumulated value "s" is smaller than the previous accumulated value. Thus, the maximum accumulated value is not updated. Owing to this system, when the movement of the controller 5 substantially stops during the swing period and the change amount of the acceleration vector (and the processing acceleration vector) becomes very small, the change amount "as" also becomes very small. Therefore, the maximum accumulated value is not updated. When the movement of the controller 5 substantially stops, the accumulated value "s" gradually becomes smaller. Therefore, the maximum accumulated value is used to calculate the swing strength. Owing to this, the very small motion of the controller 5 after the actual swing of the controller 5 is finished does not influence the swing strength. The swing strength can be calculated accurately. Especially when the start and termination of the swing period is determined by whether the button is pressed or not, the swing period which is set in the game apparatus 3 does not match the time period from the start until the end of the actual swing of the controller 5. Therefore, it is effective to calculate the accumulated value using expression (3) and calculate the swing strength using the maximum accumulated value.

In the above game processing, the swing strength "p" is calculated using the maximum acceleration magnitude av_max in addition to the maximum accumulated value s_max (step S16). Owing to this, even when the controller 5 is swung slowly, the swing strength can be calculated accurately. Now, the reason will be described.

During the golf game, the player occasionally swings the controller 5 relatively slowly, for example, as if swinging a putter. In such a case, the change amount of the acceleration vector (or the processing acceleration vector) does not become very large during the swing period, and as a result, the maximum accumulated value s_max may become too small. Especially in this embodiment, the maximum accumulated value s_max is calculated using the processing acceleration vector, which changes so as to follow the acceleration vector detected by the acceleration sensor 37. Therefore, depending on the value of constants C1 and C2, when the controller 5 is swung slowly, the change amount "as" does not become large and the swing strength may become almost 0. In order to avoid this, in this embodiment, the swing strength "p" is calculated using the maximum acceleration magnitude av_max in addition to the maximum accumulated value s_max. The maximum acceleration value av_max becomes large to some extent even when the controller 5 is swung slowly. By calculating the swing strength "p" also using the maximum acceleration magnitude av_max, the swing strength "p" is avoided from becoming too small.

In the above embodiment, the golf game is described as an example. The certain exemplary embodiments described herein are applicable to any game in which a game operation is performed by swinging a controller itself including an acceleration sensor. The certain exemplary embodiments are applicable to any genre of games as well as games of sports such as a baseball game or a tennis game.

As described above, the certain exemplary embodiments can, for example, calculate the swing strength of an input device (controller) and is applicable to, for example, a game program and a game apparatus.

While the certain exemplary embodiments have been described in detail, the foregoing description is in all aspects illustrative and not restrictive. It is understood that numerous other modifications and variations can be devised without departing from the scope of the certain exemplary embodiments described herein.

What is claimed is:

1. A computer-readable storage medium having stored thereon a game program executable by a computer of a game apparatus for executing game processing in accordance with a movement of an input device, wherein the game program causes the computer to execute:
    obtaining an acceleration generated in at least two predetermined axial directions of the input device repeatedly;
    calculating a change amount of each of the obtained accelerations during a predetermined time period;
    calculating an accumulated value obtained by accumulating the calculated change amounts;
    calculating a swing strength of the input device based on the accumulated value; and
    executing the game processing using the calculated swing strength.

2. A computer-readable storage medium according to claim 1, wherein:
    the input device comprises a predetermined button; and
    the game program causes the computer to further execute setting the predetermined time period based on a pressing state of the predetermined button.

3. A computer-readable storage medium according to claim 1, wherein the game program causes the computer to further execute setting a time period in which the acceleration has a magnitude of equal to or larger than a predetermined magnitude as the predetermined period.

4. A computer-readable storage medium according to claim 1, wherein:
    in calculating the accumulated value, the computer calculates the accumulated value each time the change amount is calculated, such that when the change amount is smaller than a reference value, the accumulated value is smaller than a previous accumulated value; and
    in calculating the swing strength, the computer calculates the swing strength, such that as the maximum accumulated amount calculated during the predetermined period is larger, the swing strength is greater.

5. A computer-readable storage medium according to claim 1, wherein:
    in calculating the accumulated value, the computer calculates, each time the change amount is calculated, a new accumulated value by adding the change amount to a value obtained by subtracting a predetermined amount from the current accumulated value; and
    in calculating the swing strength, the computer calculates the swing strength, such that as the maximum accumulated amount calculated during the predetermined period is larger, the swing strength is greater.

6. A computer-readable storage medium according to claim 5, wherein the predetermined amount is a predetermined ratio of the current accumulated value.

7. A computer-readable storage medium according to claim 1, wherein:
    the game program causes the computer to further execute calculating a magnitude of each of the accelerations obtained during the predetermined period; and
    in calculating the swing strength, the computer calculates the swing strength of the input device based on the accumulated value and the acceleration magnitudes.

8. A computer-readable storage medium according to claim 7, wherein in calculating the swing strength, the computer calculates the swing strength of the input device based on the maximum value of the acceleration magnitudes calculated during the predetermined period and the accumulated value.

9. A computer-readable storage medium according to claim 1, wherein in obtaining the acceleration, the computer calculates, as an acceleration to be obtained, the result of smoothening the obtained acceleration.

10. A computer-readable storage medium according to claim 9, wherein:
    the input device comprises an acceleration sensor for detecting an acceleration in at least two predetermined axial directions; and
    in obtaining the acceleration, the computer calculates, as an acceleration to be obtained, a vector which changes so as to follow a vector represented by data output from the acceleration sensor.

11. A computer-readable storage medium according to claim 9, wherein:
    the input device comprises an acceleration sensor for detecting an acceleration in at least two predetermined axial directions; and
    in obtaining the acceleration, the computer calculates, as an acceleration to be newly obtained, a vector internally dividing a range between a vector representing the current acceleration and a vector represented by data output from the acceleration sensor.

12. A computer-readable storage medium according to claim 10, wherein:
    the game program causes the computer to further execute calculating a magnitude of each of the accelerations obtained during the predetermined period; and
    in calculating the swing strength, the computer calculates the swing strength of the input device based on the accumulated value and the acceleration magnitudes.

13. A computer-readable storage medium according to claim 12, wherein in calculating the swing strength, the computer calculates the swing strength of the input device based on the maximum value of the acceleration magnitudes calculated during the predetermined period and the accumulated value.

14. A computer-readable storage medium according to claim 11, wherein:
    the game program causes the computer to further execute calculating a magnitude of each of the accelerations obtained during the predetermined period; and
    in calculating the swing strength, the computer calculates the swing strength of the input device based on the accumulated value and the acceleration magnitudes.

15. A computer-readable storage medium according to claim 14, wherein in calculating the swing strength, the computer calculates the swing strength of the input device based on the maximum value of the acceleration magnitudes calculated during the predetermined period and the accumulated value.

16. A computer-readable storage medium according to claim 1, wherein in calculating the change amount, the computer calculates, as the change amount, a magnitude of a differential vector between an acceleration vector representing the latest obtained acceleration and an acceleration vector representing the acceleration obtained immediately previously.

17. A game apparatus for executing game processing in accordance with a movement of an input device, the game apparatus comprising:

obtaining programmed logic circuitry for obtaining an acceleration generated in at least two predetermined axial directions of the input device repeatedly;

change amount calculation programmed logic circuitry for calculating a change amount of each of the accelerations obtained by the obtaining programmed logic circuitry during a predetermined time period;

accumulated value calculation programmed logic circuitry for calculating an accumulated value obtained by accumulating the calculated change amounts;

swing strength calculation programmed logic circuitry for calculating a swing strength of the input device based on the accumulated value; and a game processor for executing the game processing using the calculated swing strength.

18. A game apparatus according to claim 17, further comprising time period setting programmed logic circuitry for setting a time period in which the acceleration has a magnitude of equal to or larger than a predetermined magnitude as the predetermined time period.

19. A game apparatus according to claim 17, wherein:

the input device comprises an acceleration sensor for detecting an acceleration in at least two predetermined axial directions; and the obtaining programmed logic circuitry calculates, as an acceleration to be obtained, a vector which changes so as to follow a vector represented by data output from the acceleration sensor.

20. A game apparatus according to claim 17, wherein:

the input device comprises an acceleration sensor for detecting an acceleration in at least two predetermined axial directions; and the obtaining programmed logic circuitry calculates, as an acceleration to be newly obtained, a vector internally dividing a range between a vector representing the current acceleration and a vector represented by data output from the acceleration sensor.

21. A game apparatus according to claim 17, further comprising magnitude calculation programmed logic circuitry for calculating a magnitude of each of the accelerations obtained during the predetermined time period; and the swing strength calculation programmed logic circuitry calculates the swing strength of the input device based on the accumulated value and the acceleration magnitudes.

* * * * *